US006249445B1

(12) United States Patent
Sugasawa

(10) Patent No.: US 6,249,445 B1
(45) Date of Patent: Jun. 19, 2001

(54) BOOSTER INCLUDING CHARGE PUMPING CIRCUIT WITH ITS ELECTRIC POWER CONSUMPTION REDUCED AND METHOD OF OPERATING THE SAME

(75) Inventor: Yasuo Sugasawa, Kumamoto (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/502,422

(22) Filed: Feb. 11, 2000

(30) Foreign Application Priority Data

Feb. 15, 1999 (JP) ........................................ 11-036498

(51) Int. Cl.[7] ........................ H02M 3/18; H02M 7/00; H02M 7/19

(52) U.S. Cl. ........................ 363/60; 363/59; 307/110

(58) Field of Search .................. 363/59, 60; 307/110; 320/166

(56) References Cited

U.S. PATENT DOCUMENTS 4,141,064 * 2/1979 Nagashima ........................ 363/60
5,159,543 * 10/1992 Yamawaki ........................ 363/60
5,414,614 * 5/1995 Fette et al. ........................ 363/59
5,499,183 * 3/1996 Kobatake ........................ 363/59
5,635,776 * 6/1997 Imi ........................ 307/110
5,959,853 * 9/1999 Kos ........................ 363/59
6,020,781 * 2/2000 Fujioka ........................ 363/60
6,026,002 * 2/2000 Viehmann ........................ 363/60

FOREIGN PATENT DOCUMENTS 64-39263 2/1989 (JP) ........................ H02M/3/07
1-241659 9/1989 (JP) ........................ G06F/15/06
5-64429 3/1993 (JP) ........................ H02M/3/155
7-160215 6/1995 (JP) ........................ H02M/3/07
7-226078 8/1995 (JP) ........................ H02M/3/07
10-304653 11/1998 (JP) ........................ H02M/3/07
10-304654 11/1998 (JP) ........................ H02M/3/07

* cited by examiner

*Primary Examiner*—Peter S. Wong
*Assistant Examiner*—Bao Q. Vu
(74) *Attorney, Agent, or Firm*—Hutchins, Wheeler & Dittmar

(57) ABSTRACT

A booster is composed of a switching circuit outputting a clock signal and a charge pumping circuit boosting an input voltage to generate an output voltage in response to the clock signal. The switching circuit selects one from among frequencies as a frequency of the clock signal in response to the output voltage.

21 Claims, 14 Drawing Sheets

BOOSTER INCLUDING CHARGE PUMPING CIRCUIT WITH ITS ELECTRIC POWER CONSUMPTION REDUCED AND METHOD OF OPERATING THE SAME

BACKGROUND OF THE INVENTION

1. Field of the Invention

The present invention is related to a booster including a charge pumping circuit. More particularly, the present invention is related to a booster which includes a charge pumping circuit and can reduce its electric power consumption.

2. Description of the Related Art

A booster including a charge pumping circuit is widely used in semiconductor apparatuses. A conventional booster is disclosed in Japan Laid Open Patent Application (JP-A-Heisei, 1-241659). The conventional booster has a switching circuit as shown in FIG. 1. The switching circuit 201 generates a clock signal CIN from a standard clock signal CLK, and sends it through a clock driver 202 to a charge pumping circuit 203. A frequency of the clock signal CIN is switched on the basis of whether the semiconductor apparatus including the booster is in a standby mode or a normal operation mode. The charge pumping circuit 203 boosts a voltage $V_{IN}$ inputted from an input terminal. The charge pumping circuit 203 generates a voltage $V_{OUT}$ higher than the voltage $V_{IN}$ and further outputs the voltage $V_{IN}$ from an output terminal. The clock signal CIN is used to boost the voltage $V_{IN}$ to the voltage $V_{OUT}$.

The switching circuit 201 has a 1/n divider 204 and a selector 205, as shown in FIG. 2. The 1/n divider 204 is provided with dividers 206 to 209. The selector 205 is provided with an inverter 210, AND gates 211, 212 and an OR gate 213.

The switching circuit 201 operates differently depending on whether the semiconductor apparatus is in the normal operation mode or the standby mode. At a time of the normal operation mode, the switching circuit 201 outputs the standard clock signal CLK as the clock signal CIN. At a time of the standby mode, the switching circuit 201 outputs a clock signal in which a standard clock signal is divided by 1/n at the time of the standby mode, as the clock signal CIN.

Incidentally, other boosters are disclosed in Japan Laid Open Patent Application (JP-A-Showa 64-39263, JP-A-Heisei 5-64429, JP-A-Heisei 7-160215, JP-A-Heisei 7-226078, JP-A-Heisei 10-304653 and JP-A-Heisei 10-304654).

The conventional booster consumes large electric power at the time of the normal operation. This is because the conventional booster always sends a signal having the same frequency as the standard clock signal CLK to the charge pumping circuit, as the clock signal CIN at the time of the normal operation. A booster is desired in which the electric power consumption is reduced at the time of the normal operation.

Also, the conventional booster is large in variation of an output voltage. This is because the output voltage is not controlled. A booster is desired in which the variation of the output voltage is small.

SUMMARY OF THE INVENTION

Therefore, an object of the present invention is to provide a booster in which the electric power consumption can be reduced at the time of the normal operation. Another object of the present invention is to provide a booster in which the variation of an output voltage is small. Still another object of the present invention is to provide a booster in which when the output voltage is largely deviated from a target value, it can be quickly recovered.

In order to achieve an aspect of the present invention, a booster includes a switching circuit outputting a clock signal and a charge pumping circuit boosting an input voltage to generate an output voltage in response to the clock signal. The switching circuit selects one from among a plurality of frequencies as a frequency of the clock signal in response to the output voltage.

The frequency of the clock signal may be set to the highest one of the plurality of frequencies when an integrated circuit including the booster is reset.

The frequency of the clock signal may be set to the highest one of the plurality of frequencies when a power supply of an integrated circuit including the booster is turned on.

The frequency of the clock signal may be set to the lowest one of the plurality of frequencies when an integrated circuit including the booster is in a standby mode.

The frequency of the clock signal may be selected in response to difference between the output voltage and a reference voltage.

In that case, the frequency of the clock signal is desirably increased when the output voltage is decreased.

The switching circuit may include a voltage comparator, a frequency selector and a outputting unit. The voltage comparator compares the output voltage with a reference voltage and generates a first signal indicating whether or not the output voltage is higher than the reference voltage. The frequency selector selects one of the plurality of frequencies in response to the first signal and generates a second signal indicating which of the plurality of frequencies is selected. The outputting unit outputs the clock signal having the one of the plurality of frequencies in response to the second signal.

In order to achieve another aspect of the present invention, a method of operating a booster with a charge pumping circuit is composed of selecting one from among a plurality of frequencies as a frequency of a clock signal, generating the clock signal having the frequency, and boosting an input voltage to generate an output voltage in response to the clock signal. The selecting is performed in response to the output voltage.

The selecting may include selecting the highest one of the plurality of frequencies as the frequency of the clock signal when an integrated circuit including the booster is reset.

The selecting may include selecting the highest one of the plurality of frequencies as the frequency of the clock signal when a power supply of an integrated circuit including the booster is turned on.

The selecting may include selecting lowest one of the plurality of frequencies as the frequency of the clock signal when an integrated circuit including the booster is in a standby mode.

The selecting is performed in response to difference between the output voltage and the reference voltage.

The frequency of the clock signal is increased when the output voltage is decreased.

DESCRIPTION OF THE PREFERRED EMBODIMENTS

A booster of the present invention will be described below in detail with reference to the attached drawings.

Figure 1:
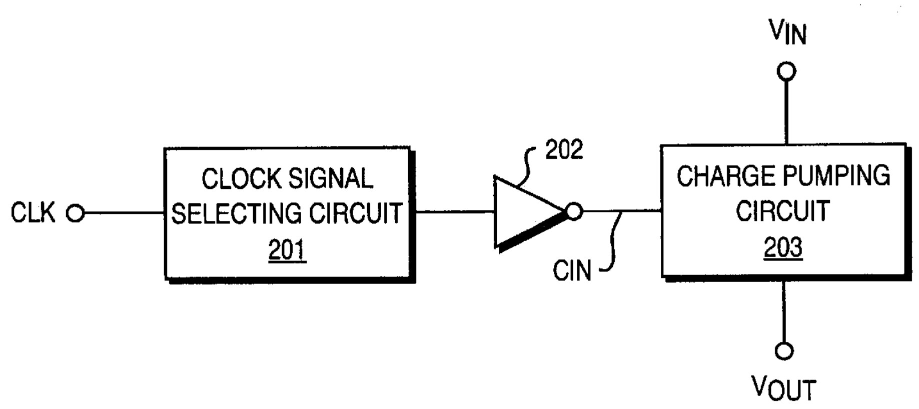
FIG. 1 shows a configuration of a conventional booster.
Figure 2:
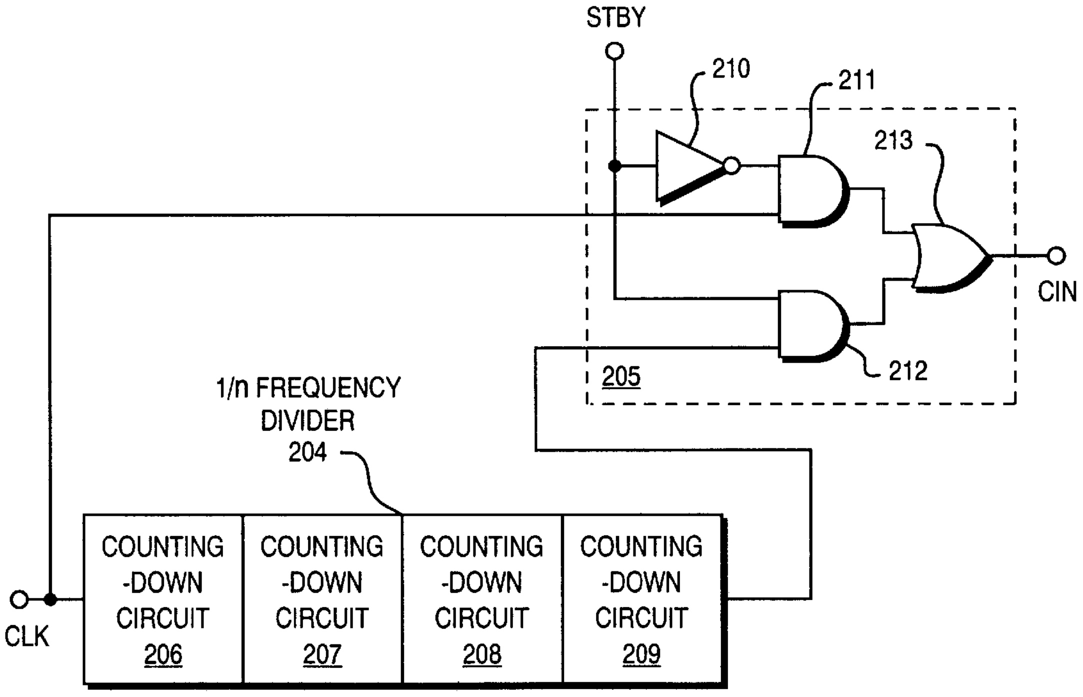
FIG. 2 shows a configuration of a switching circuit 201 included in a conventional booster.
Figure 3:
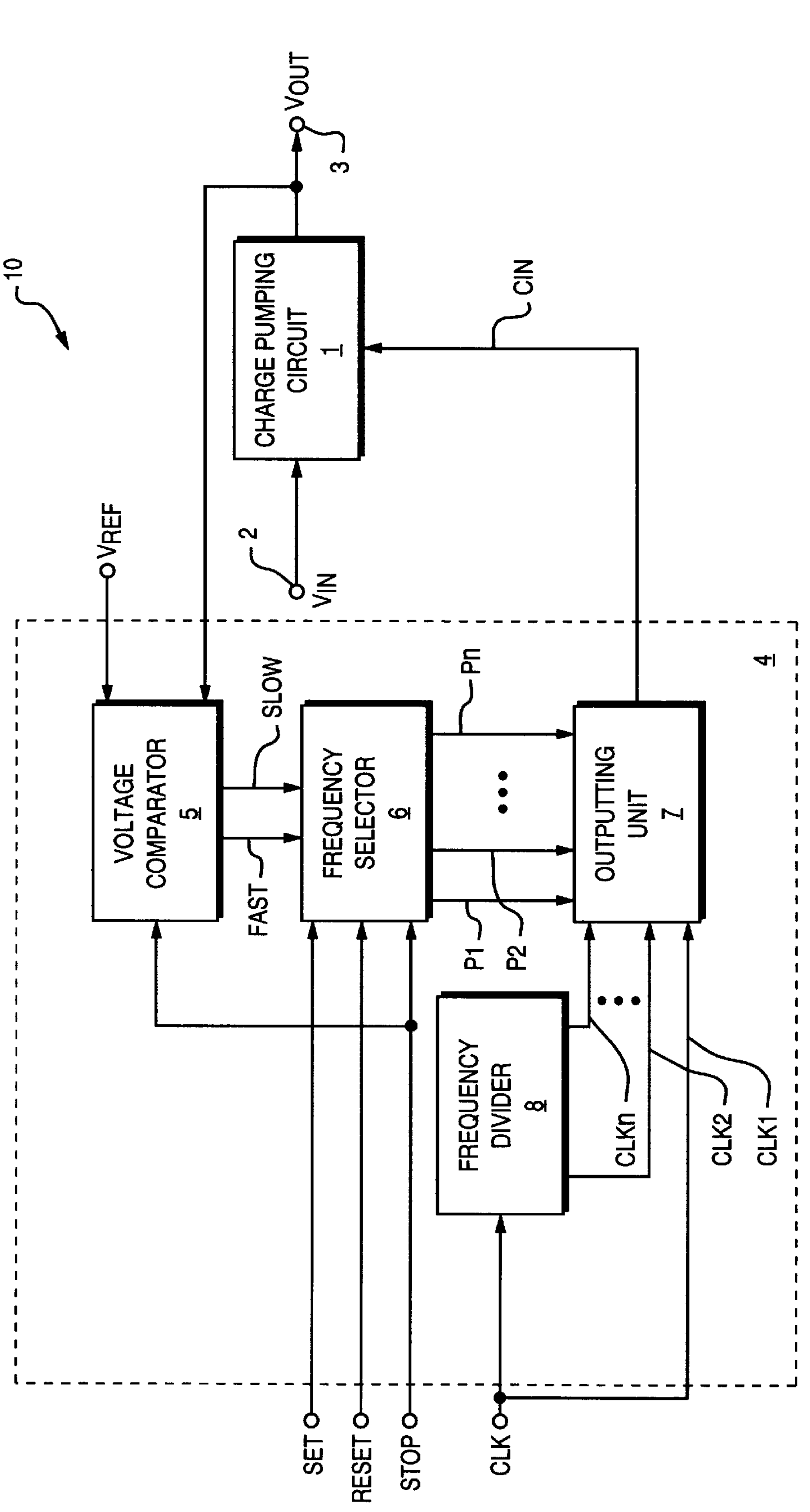
FIG. 3 shows a booster of a first embodiment in the present invention.
Figures 4A, 4B, 4C, 4D, 4E:
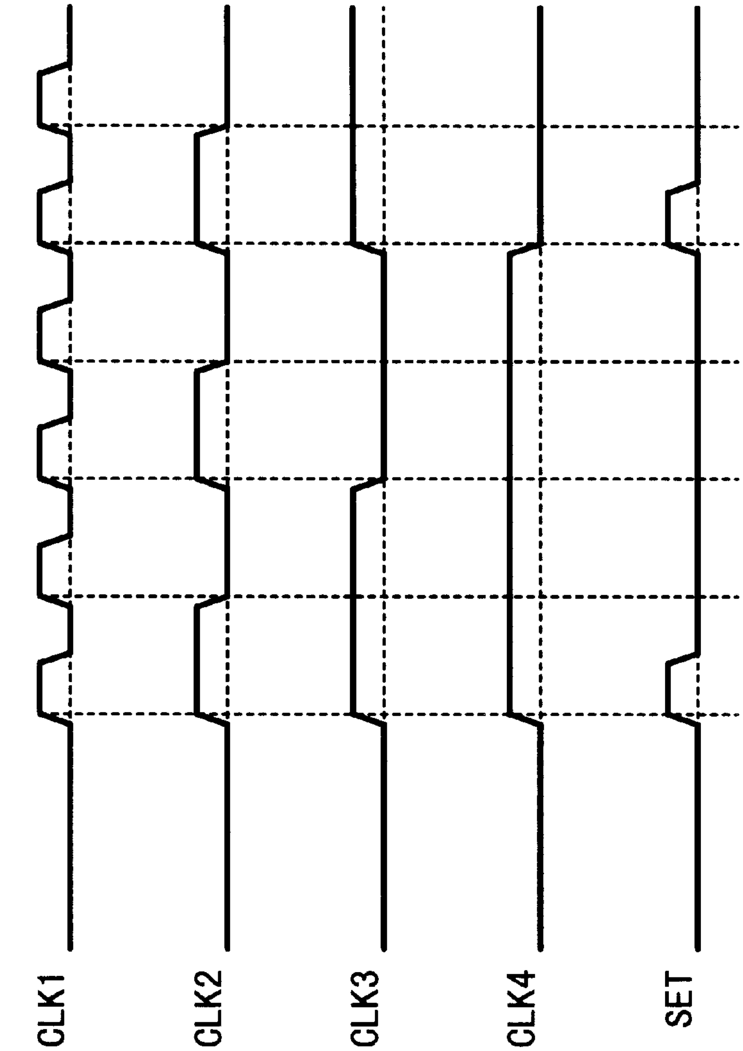
FIGS. 4A to 4E are timing charts of clock signals CLK1 to CLK4 and a signal SET.
Figure 5:
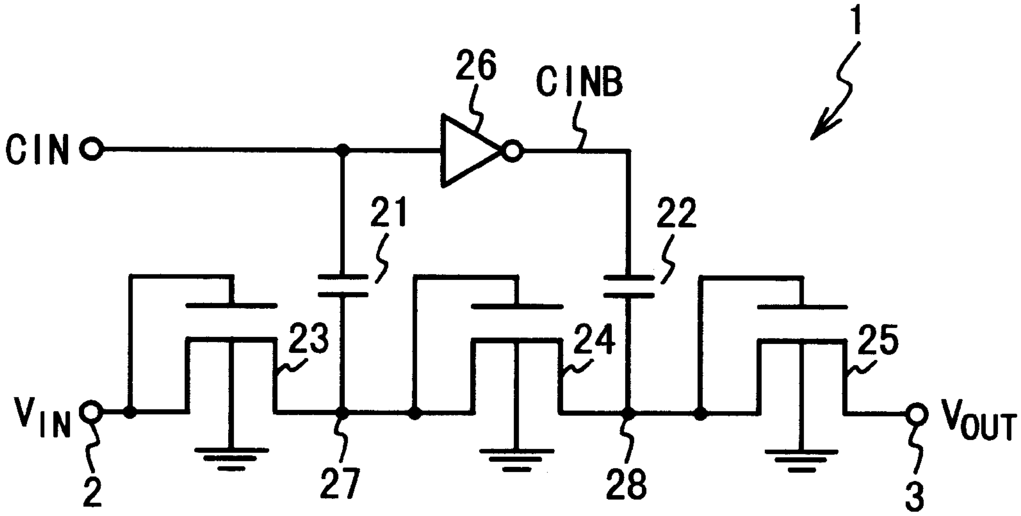
FIG. 5 shows a configuration of a charge pumping circuit 1 included in the booster of the first embodiment.
Figures 6A, 6B, 6C, 6D, 6E, 6F, 6G, 6H, 6I:
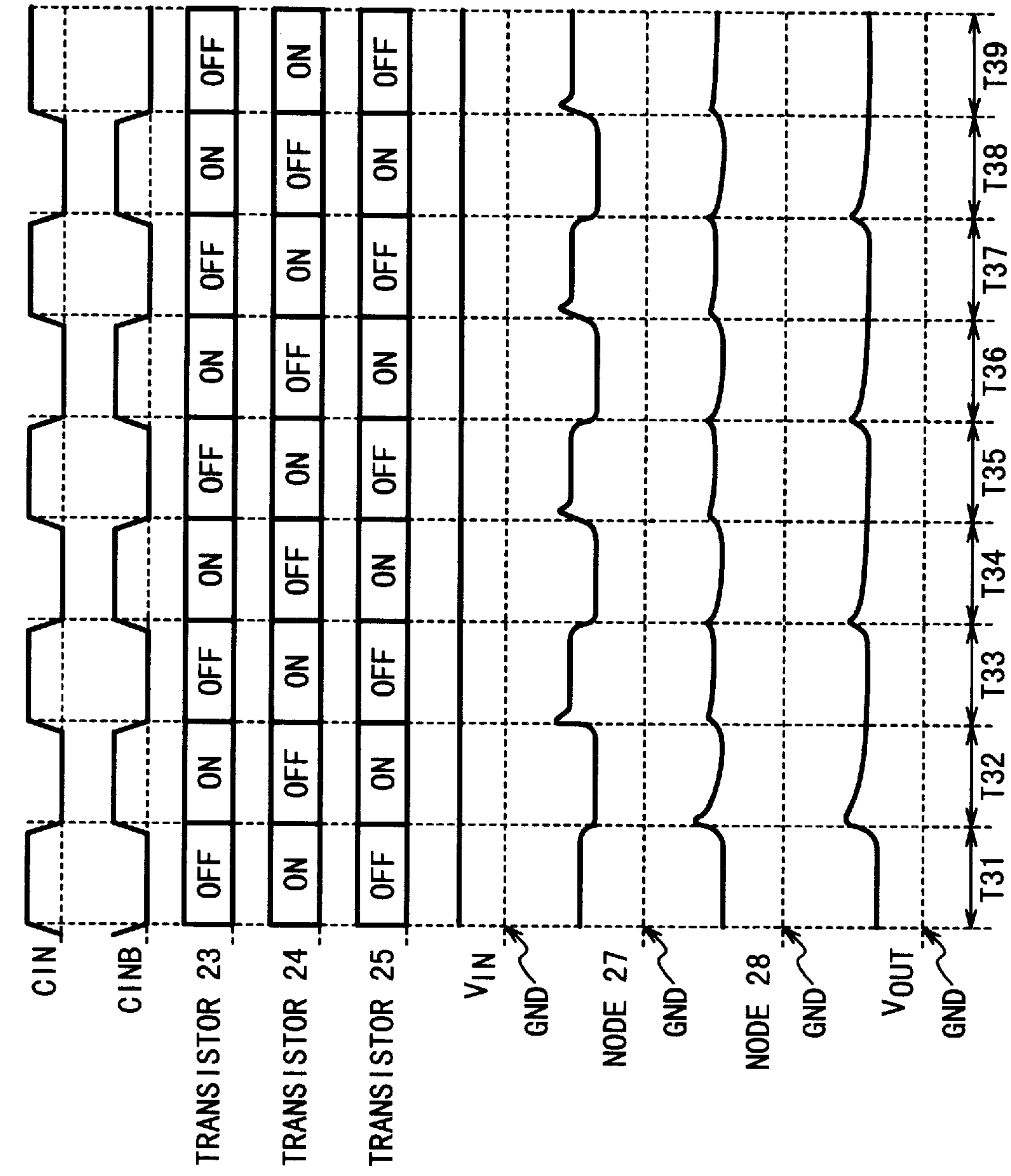
FIGS. 6A to 6I are timing charts of explaining an operation of the charge pumping circuit 1 included in the booster of the first embodiment.

FIG. 3 shows a booster of a first embodiment according to the present invention. The booster of the first embodiment is provided with a charge pumping circuit and a switching circuit. The charge pumping circuit 1 boosts an input voltage $V_{IN}$ inputted to an input terminal 2 to generate an output voltage $V_{OUT}$ higher than the input voltage $V_{IN}$. The charge pumping circuit 1 generates the output voltage $V_{OUT}$ using a clock signal CIN. The higher the frequency of the clock signal CIN, the higher the output voltage $V_{OUT}$. The charge pumping circuit 1 outputs the output voltage $V_{OUT}$ from an output terminal 3 to an outer circuit (not shown). The output voltage $V_{OUT}$ is varied because of a current consumed by the outer circuit.

A switching circuit 4 outputs one clock signal selected from among a plurality of clock signals CLK1 to CLKn as the clock signal CIN. Here, n is a natural number. The clock signals CLK1 to CLKn are the clock signals of which frequencies are different from each other. The clock signal CLK1 has the highest frequency, and the clock signal CLKn has the lowest frequency. A frequency becomes lower as i implying an index of a clock signal CLKi is larger. A frequency of the clock signal CLKi is half that of a clock signal CLK(i−1), as shown in FIGS. 4A to 4D.

The clock signal CIN is selected in accordance with the voltage $V_{OUT}$. When the voltage $V_{OUT}$ is lower than a standard voltage $V_{REF}$, a clock signal having a relatively high frequency is selected as the clock signal CIN. When the voltage $V_{OUT}$ is higher than the standard voltage $V_{REF}$, a clock signal having a relatively low frequency is selected as the clock signal CIN. The process of selecting the clock signal CIN will be described later. The voltage $V_{OUT}$ is adjusted in accordance with the frequency of the clock signal CIN.

A signal SET is inputted to the switching circuit 4. The signal SET is a signal to indicate a timing when the clock signal CIN is switched. The signal SET is synchronous with the clock signal CLK1, as shown in FIG. 4. The signal SET becomes at the high level for each several cycles of the clock signal CLK1. The switching circuit 4 switches the clock signal CIN in accordance with a comparison result between the voltage $V_{OUT}$ and the standard voltage $V_{REF}$ each time the signal SET becomes at a high level. Here, the high level is a power supply voltage.

Also, the switching circuit 4 selects the clock signal CIN in accordance with a signal RESET. The signal RESET is set to the high level when a semiconductor integrated circuit including the booster of the first embodiment has been reset or when a power supply of the integrated circuit has been turned on to then start an operation. When the signal RESET is at the high level, a switching circuit 4 outputs the clock signal CLK1 as the clock signal CIN. Here, the clock signal CLK1 is the clock signal having the highest frequency among the plurality of clock signals CLK1 to CLKn (n is the natural number). A potential of the output voltage $V_{OUT}$ outputted from the output terminal 3 is raised as quickly as possible.

Moreover, the switching circuit 4 selects the clock signal CIN in accordance with a signal STOP. The signal STOP is set to the high level when the semiconductor integrated circuit including the booster 10 has been set to a small electric power consumption mode or a standby mode. When the signal STOP is at the high level, the switching circuit 4 outputs the clock signal CLKn as the clock signal CIN. The clock signal CLKn is the clock signal having the lowest frequency among the plurality of clock signals CLK1 to CLKn (n is the natural number). Accordingly, the electric power consumption is reduced at a time of the small electric power consumption mode or the standby mode.

The charge pumping circuit 1 and the switching circuit 4 will be respectively described in detail. The case will be exemplified below in which the number of clock signals is 4, namely, n=4.

At first, the configuration of the charge pumping circuit 1 is described. FIG. 4 shows a circuit diagram of the charge pumping circuit 1. The charge pumping circuit 1 contains capacitors 21, 22, N-channel transistors 23, 24 and 25, and an inverter 26. The clock signal CIN is inputted to a node 29. One electrode of the capacitor 21 is connected to the node 29. The other electrode of the capacitor 21 is connected to a node 27. An input terminal of the inverter 26 is further connected to the node 29. An output terminal of the inverter 26 is connected to one electrode of the capacitor 22. The other electrode of the capacitor 22 is connected to a node 28.

A drain and a gate of the N-channel transistor 23 are connected to the input terminal 2. A source of the N-channel transistor 23 is connected to the node 27. The node 27 is further connected to a drain and a gate of the N-channel transistor 24. A source of the N-channel transistor 25 is connected to the node 28.

A drain and a gate of the N-channel transistor 25 is connected to the node 28. The source of the N-channel transistor 25 is connected to the output terminal 3. A voltage of the output terminal 3 is the output voltage $V_{OUT}$.

Charges are accumulated in the capacitors 21, 22, in accordance with a voltage applied by the clock signal CIN. The charges accumulated in the capacitors 21, 22 are supplied to the nodes 27, 28, respectively. As a result, the input voltage $V_{IN}$ is raised to the output voltage $V_{OUT}$.

The operations of the charge pumping circuit 1 will be described below with reference to FIG. 5 and FIGS. 6A to 6I. Symbols used in the following explanation are as follows. A signal CINB is an output signal of the inverter 26. The signal CINB is a signal in which a logic of the clock signal CIN is inverted. A voltage Vt is a threshold voltage of the N-channel transistors 23, 24 and 25. A voltage $V_H$ is a voltage when the clock signal CIN and the signal CINB are at the high level. Incidentally, a voltage when the clock signal CIN and the signal CINB are at a low level, which is a ground potential.

Also, the following initial state is assumed in the following explanation. An initial voltage of the clock signal CIN is assumed to be at the low level. At this time, an initial voltage of the signal CINB is at the high level. An initial voltage of the input voltage $V_{IN}$ is $V_{IN0}$. The input voltage $V_{IN}$ is assumed to be constantly kept at $V_{IN0}$.

An initial voltage of the node 27 is assumed to be $V_{N27}$. $V_{N27}$ is substantially equal to ($V_{IN0}$−Vt). Since the initial voltage of the clock signal CIN is at the low level, the voltage $V_{N27}$ is applied to the capacitor 21 at the initial state. That is, charges are accumulated in the capacitor 21 in advance.

The operation of the charge pumping circuit 1 in a period T31 will be described below. The period T31 is a period in which the charges are accumulated in the capacitor 22. As shown in FIG. 5A, the clock signal CIN is changed from the low level to the high level at the beginning of the period T31. A potential of the node 27 becomes $V_{N27}+V_H$. The N-channel transistor 23 is turned off. The N-channel transistor 24 is turned on. The charges accumulated in the capacitor 21 are shifted through the N-channel transistor 24 and the node 28 to the capacitor 22. At this time, a potential of the node 28 becomes $V_{OUT}$−Vt. The capacitor 22 is charged depending on $V_{OUT}$−Vt. At this time, the N-channel transistor 25 is turned off. The charges are not supplied to the output terminal 3. On the other hand, the current is consumed by the outer circuit connected to the output terminal 3. The voltage $V_{OUT}$ is gradually dropped.

The operation of the charge pumping circuit 1 in a period T32 next to the period T31 will be described below. The period T32 is a period in which the charges accumulated in the capacitor 22 are shifted to the output terminal 3 to thereby make the $V_{OUT}$ higher. Also, it is a period in which the charges to charge the capacitor 22 are accumulated in the capacitor 21.

At the beginning of the period T32, the clock signal CIN is changed from the high level to the low level. At this time, the signal CINB is changed from the low level to the high level. At this time, since the capacitor 22 is charged in accordance with $V_{OUT}$−Vt, the potential of the node 28 is raised to $V_{OUT}$−Vt+$V_H$. The N-channel transistor 24 is turned off. The N-channel transistor 25 is turned on.

When the N-channel transistor 25 has been turned on, the charges accumulated in the capacitor 22 are supplied to the output terminal 3. Accordingly, the potential of the output terminal 3 is made higher. After that, the current is consumed by the outer circuit connected to the output terminal 3. The voltage $V_{OUT}$ is gradually dropped.

On the other hand, the N-channel transistor 23 is turned on. The potential of the node 27 becomes about $V_{IN0}$−Vt. The capacitor 21 is charged in accordance with $V_{IN0}$−Vt. Charges are accumulated in the capacitor 21.

After that, the operations similar to those of the periods T31, T32 are repeated. Due to such operations, the charge pumping circuit 1 raises the voltage $V_{IN}$ to the voltage $V_{OUT}$, and then outputs from the output terminal 3.

As is understood from the above-mentioned operations, the more charges are supplied to the output terminal 3, as the frequency of the clock signal CIN becomes higher. That is, the voltage $V_{OUT}$ is further raised, as the frequency of the clock signal CIN becomes higher. When the voltage $V_{OUT}$ has been dropped, the frequency of the clock signal CIN sent to the charge pumping circuit 1 is set to be higher. Accordingly, the voltage $V_{OUT}$ is kept constant.

Next, the configuration of the switching circuit 4 will be described below. The switching circuit 4 includes a voltage comparator 5. The voltage comparator 5 detects the variation of the voltage $V_{OUT}$. The variation of the voltage $V_{OUT}$ is detected by comparing the voltage $V_{OUT}$ with a standard voltage $V_{REF}$. The voltage comparator 5 reports the comparison result between the voltage $V_{OUT}$ and the standard voltage $V_{REF}$, to a frequency selector 6 by a signal FAST and a signal SLOW.

When the voltage $V_{OUT}$ is lower than the standard voltage $V_{REF}$, the voltage comparator 5 sets the signal FAST to the high level, and sets the signal SLOW to the low level. When the signal FAST is at the high level and the signal SLOW is at the low level, the frequency selector 6 selects a clock signal having a higher frequency as the clock signal CIN.

When the voltage $V_{OUT}$ is higher than the standard voltage $V_{REF}$, the voltage comparator 5 sets the signal FAST to the low level, and sets the signal SLOW to the high level. When the signal FAST is at the low level and the signal SLOW is at the high level, the frequency selector 6 selects a clock signal having a lower frequency as the clock signal CIN.

Also, the voltage $V_{OUT}$ is detected in accordance with the signal STOP. As mentioned above, the signal STOP reports to the booster as to whether or not the semiconductor integrated circuit including the is at a standby mode. When the signal STOP is at the low level, the voltage comparator 5 carries out the above-mentioned operations.

When the signal STOP is at the high level, the voltage comparator 5 stops operating in order to reduce the electric power consumption. Also, when the signal STOP is at the high level, the voltage comparator 5 sets the signal FAST to the low level, and sets the signal SLOW to the high level. This is because in a case of the standby mode, it is not desirable to increase the frequency of the clock signal CIN to then increase the electric power consumption.

Figure 7:
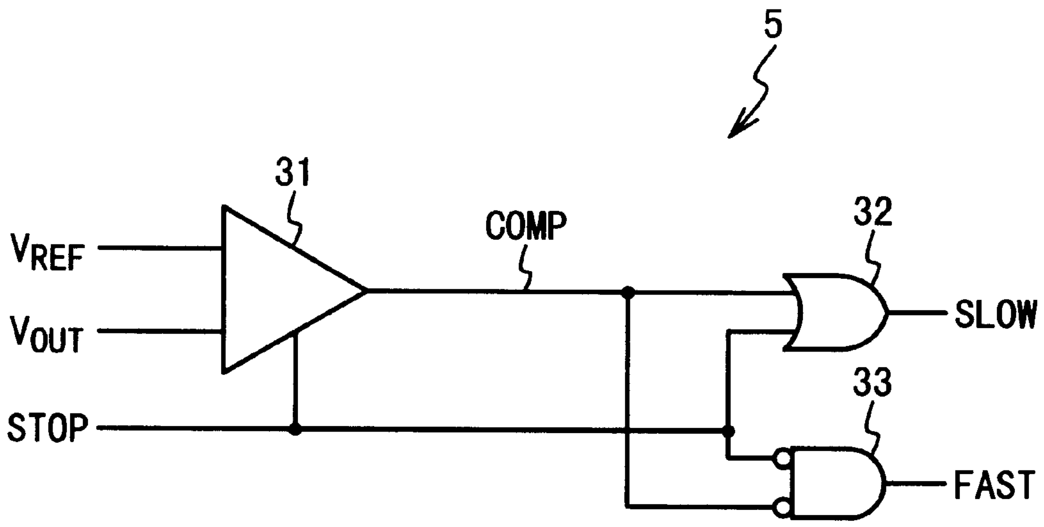
FIG. 7 shows a configuration of a voltage comparator 5 included in the booster of the first embodiment.

FIG. 7 shows the circuit diagram of the voltage comparator 5. The voltage comparator 5 has a comparator 31. The comparator 31 compares the voltage $V_{OUT}$ with the standard voltage $V_{REF}$. The comparator 31 outputs the compared result as a signal COMP. When the voltage $V_{OUT}$ is higher than the standard voltage $V_{REF}$, the signal COMP becomes at the high level. When the voltage $V_{OUT}$ is lower than the standard voltage $V_{REF}$, the signal COMP becomes at the low level. The signal COMP is outputted to the OR gate 32 and the AND gate 33, respectively. The OR gate 32 carries out a logical OR between the signal COMP and the signal STOP, and then outputs as the signal SLOW. The AND gate 33 carries out a logical AND between a negative logic of the signal COMP and a negative logic of the signal STOP, and then outputs as the signal FAST.

The signal FAST and the signal SLOW are inputted to the frequency selector 6. The signal SET, the signal RESET and the signal STOP are also inputted to the frequency selector 6. The frequency selector 6 determines that any one of the clock signals CLK1, CLK2, CLK3 and CLK4 is the clock signal CIN, in accordance with the signal FAST and the signal SLOW.

The frequency selector 6 reports the determined result to the outputting unit 7 by using signals P1, P2, P3 and P4. Any one of the signals P1, P2, P3 and P4 is at the high level. When the signal P1 is at the high level, this implies that the clock signal CLK1 is selected. Similarly, when a signal Pi (i is a natural number between 1 and 4) is at the high level, this implies that a clock signal CLKi is selected.

The frequency selector 6 determines that any one of the signals P1, P2, P3 and P4 is set to the high level, by using the following manner. When the signal SET is at the low level, the frequency selector 6 maintains the signals P1, P2, P3 and P4 in their original states. That is, when the signal SET is at the low level, the clock signal CIN is maintained in its original state, irrespective of the detected result of the voltage $V_{OUT}$.

When the signal SET becomes at the high level, the frequency selector 6 detects the signal FAST and the signal SLOW. Here, let us suppose that a signal Pi is at the high level immediately before the detection of the signal FAST and the signal SLOW. Here, i is the natural number between 1 and 4. Also, let us suppose that another signal Pj is at the low level. Here, j is the natural number between 1 and 4, and not equal to i.

Let us suppose that the frequency selector 6 detects that the signal FAST is at the high level and the signal SLOW is at the low level, when the signal SET becomes at the high level. The frequency selector 6 switches the signal Pi from the high level to the low level. Moreover, the frequency selector 6 switches a signal P(i−1) from the low level to the high level. That is, a clock signal having a higher frequency is selected as the clock signal CIN. However, when i=1, the signals P1, P2, P3 and P4 are maintained in their original states. This is because the clock signal having the highest frequency is already selected as the clock signal CIN.

Also, let us suppose that the frequency selector 6 detects that the signal FAST is at the low level and the signal SLOW is at the high level, when the signal SET becomes at the high level. The frequency selector 6 switches the signal Pi from the high level to the low level. Moreover, the frequency selector 6 switches a signal P(i+1) from the low level to the high level. That is, a clock signal having a higher frequency is selected as the clock signal CIN. However, when i=4, the signals P1, P2, P3 and P4 are maintained in their original states. This is because the clock signal having the lowest frequency is already selected as the clock signal CIN.

As mentioned above, the frequency selector 6 selects the clock signal CIN, in accordance with the signal FAST and the signal SLOW. However, when the signal RESET is at the high level, or when the signal STOP is at the high level, the frequency selector 6 carries out an operation different from the above-mentioned operations.

When the signal RESET is at the high level, the frequency selector 6 sets the signal P1 to the high level, and sets the signals P2, P3 and P4 to the low level. At this time, the frequency selector 6 selects a clock signal having the highest frequency of the clock signals CLK1 to CLK4 as the clock signal CIN, irrespective of the signal FAST and the signal SLOW. The signal RESET becomes at the high level when the semiconductor integrated circuit including the booster of the first embodiment has been reset. In such a case, the clock signal having the highest frequency is selected as the clock signal CIN.

Also, when the signal STOP is at the high level, the frequency selector 6 sets the signals P1, P2 and P3 to the low level, and sets the signal P4 to the high level. At this time, the frequency selector 6 selects a clock signal having the lowest frequency of the clock signals CLK1 to CLK4 as the clock signal CIN, irrespective of the signal FAST and the signal SLOW. The signal STOP becomes at the high level when the semiconductor integrated circuit including the booster is at the standby mode. In such a case, the clock signal having the lowest frequency is selected as the clock signal CIN.

Figure 8:
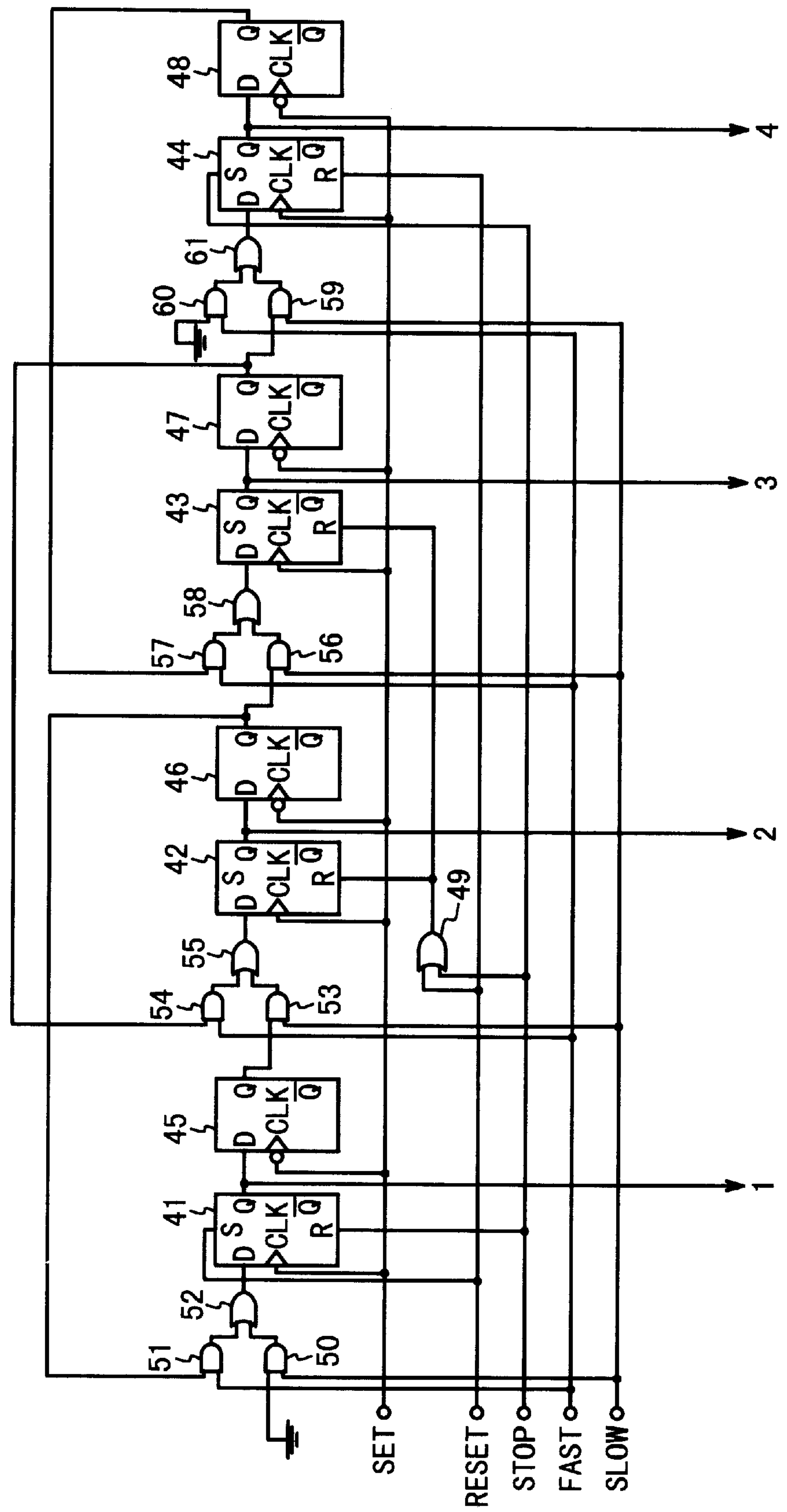
FIG. 8 shows a configuration of a frequency selector 6 included in the booster of the first embodiment.

FIG. 8 is a circuit diagram of the frequency selector 6. The frequency selector 6 includes D flip-flops 41, 42, 43 and 44. Respective outputs of the D flip-flops 41, 42, 43 and 44 are the signals P1, P2, P3 and P4. When the signal FAST is at the high level and the signal SLOW is at the low level, the frequency selector 6 carries out the operation similar to that of a shift register for sending a signal in order of the D flip-flops 41, 42, 43 and 44, each time the signal SET becomes at the high level. When the signal SLOW is at the high level and the signal FAST is at the low level, the frequency selector 6 carries out the operation similar to that of a shift register for sending a signal in order of the D flip-flops 44, 43, 42 and 41, each time the signal SET becomes at the high level.

The D flip-flops 41 to 44 included in the frequency selector 6 are the flip-flops to hold which clock signal among the clock signals CLK1 to CLK4 is selected as the clock signal CIN. Each of the D flip-flops 41 to 44 has a data terminal D, an output terminal Q, a set terminal S, a reset terminal R and a clock terminal CLK.

Signals inputted to the data terminals D of the D flip-flops 41 to 44 are switched in accordance with the signal FAST and the signal SLOW. When the signal FAST is at the high level and the signal SLOW is at the low level, the signal P2 is inputted to the data terminal D of the D flip-flop 41. The signal P3 is inputted to the data terminal D of the D flip-flop 42. The signal P4 is inputted to the data terminal D of the D flip-flop 43. The data terminal D of the D flip-flop 44 is connected to a ground potential. That is, when the signal FAST is at the high level and the signal SLOW is at the low level, the frequency selector 6 carries out the operation similar to that of the shift register for sending the signal in the order of the D flip-flops 41, 42, 43 and 44.

When the signal FAST is at the low level and the signal SLOW is at the high level, the data terminal D of the D flip-flop 41 is connected to the ground potential. The signal P1 is inputted to the data terminal D of the D flip-flop 42. The signal P2 is inputted to the data terminal D of the D flip-flop 43. The signal P3 is inputted to the data terminal D of the D flip-flop 44. That is, when the signal FAST is at the low level and the signal SLOW is at the high level, the frequency selector 6 carries out the operation similar to that of the shift register for sending the signal in the order of the D flip-flops 44, 43, 42 and 41.

The process of switching the signals inputted to the data terminals D of the D flip-flops 41 to 44 in accordance with the signal FAST and the signal SLOW will be described later.

Each of the D flip-flops 41 to 44 reads the signal inputted to the data terminal D, when the signal SET is at the high level. Each of the D flip-flops 41 to 44 holds the data of the read signal, when the signal SET is at the low level. Each of the D flip-flops 41 to 44 outputs the held data from the output terminal.

Signals outputted from the output terminals Q of the D flip-flops 41, 42, 43 and 44 are the signals P1, P2, P3 and P4, respectively. The output terminals Q of the D flip-flops 41, 42, 43 and 44 are further connected to D flip-flops 45, 46, 47 and 48, respectively.

The D flip-flops 45 to 48 are slave flip-flops of the D flip-flops 41 to 44, respectively. The D flip-flops 45 to 48 read the data of the D flip-flops 41 to 44, and then output to other circuits. When the outputs of the D flip-flops 41 to 44 are sent in their original states to the other circuits, there may be the possibility that an erroneous operation is carried out since the signal is directly sent from the data terminal D to the output terminal Q while the signal SET is at the high level. The D flip-flops 45 to 48 act exclusively on the D flip-flops 41 to 44, and then separate the signal inputted to the data terminal D and the output signal to the other circuits.

Each of the D flip-flops 45 to 48 has a data terminal D, a clock terminal CLK and an output terminal Q.

The signal SET is inputted to the respective clock terminals CLK of the D flip-flops 45 to 48. The data terminals D of the D flip-flops 45, 46, 47 and 48 are connected to the output terminals Q of the D flip-flops 41, 42, 43 and 44, respectively. That is, the signals P1 to P4 are inputted to the data terminals D of the D flip-flops 45 to 48, respectively. Each of the D flip-flops 45 to 48 reads each of the signals P1 to P4, when the signal SET is at the low level. Each of the D flip-flops 45 to 48 holds the data of the read signal when the signal SET is at the high level, and then outputs the held data.

The signals outputted by the D flip-flops 45 to 48 are inputted to the data terminals D of the D flip-flops 41 to 44. The data terminal D of any one of the D flip-flops 41 to 44 to which the signals outputted by the D flip-flops 45 to 48 are inputted is switched in accordance with the signal FAST and the signal SLOW. The switching operation is carried out by AND gates 50, 51, 53, 54, 56, 57, 59 and 60 and OR gates 52, 55, 58 and 61.

The signal SLOW is inputted to one input terminal of the AND gate 50, and the ground potential is connected to the other input terminal. The signal FAST is inputted to one input terminal of the AND gate 51, and the output terminal Q of the D flip-flop 46 is connected to the other input terminal. The output signals of the AND gates 50, 51 are inputted to the OR gate 52. The output signal of the OR gate 52 is inputted to the data terminal D of the D flip-flops 41.

When the signal FAST is at the high level and the signal SLOW is at the low level, the signal outputted by the D flip-flop 46 is inputted to the data terminal D of the D flip-flop 41. When the signal FAST is at the low level and the signal SLOW is at the high level, the ground potential is inputted to the data terminal D of the D flip-flop 41.

The signal SLOW is inputted to one input terminal of the AND gate 53, and the output terminal Q of the D flip-flop 45 is connected to the other input terminal. The signal FAST is inputted to one input terminal of the AND gate 54, and the output terminal Q of the D flip-flop 47 is connected to the other input terminal. The output signals of the AND gates 53, 54 are inputted to the OR gate 55. The output signal of the OR gate 55 is inputted to the data terminal D of the D flip-flop 42.

When the signal FAST is at the high level and the signal SLOW is at the low level, the signal outputted by the D flip-flop 47 is inputted to the data terminal D of the D flip-flop 42. When the signal FAST is at the low level and the signal SLOW is at the high level, the signal outputted by the D flip-flop 45 is inputted to the data terminal D of the D flip-flop 42.

The signal SLOW is inputted to one input terminal of the AND gate 56, and the output terminal Q of the D flip-flop 46 is connected to the other input terminal. The signal FAST is inputted to one input terminal of the AND gate 57, and the output terminal Q of the D flip-flop 48 is connected to the other input terminal. The output signals of the AND gates 56, 57 are inputted to the OR gate 58. The output signal of the OR gate 58 is inputted to the data terminal D of the D flip-flop 43.

When the signal FAST is at the high level and the signal SLOW is at the low level, the signal outputted by the D flip-flop 48 is inputted to the data terminal D of the D flip-flop 43. When the signal FAST is at the low level and the signal SLOW is at the high level, the signal outputted by the D flip-flop 46 is inputted to the data terminal D of the D flip-flop 43.

The signal SLOW is inputted to one input terminal of the AND gate 59, and the output terminal Q of the D flip-flop 47 is connected to the other input terminal. The signal FAST is inputted to one input terminal of the AND gate 60, and the ground potential is connected to the other input terminal. The output signals of the AND gates 59, 60 are inputted to the OR gate 61. The output signal of the OR gate 61 is inputted to the data terminal D of the D flip-flop 44.

When the signal FAST is at the high level and the signal SLOW is at the low level, the ground potential is inputted to the data terminal D of the D flip-flop 42. When the signal FAST is at the low level and the signal SLOW is at the high level, the signal outputted by the D flip-flop 47 is inputted to the data terminal D of the D flip-flop 42.

Also, the D flip-flops 41 to 44 change the held data, in accordance with the signal RESET and the signal STOP.

The signal RESET is inputted to the set terminal S of the D flip-flop 41. The signal STOP is inputted to the reset terminal R of the D flip-flop 41.

The output terminal of the OR gate 49 is connected to the reset terminals R of the D flip-flops 42, 43. The signal RESET and the signal STOP are inputted to the input terminal of the OR gate 49. The OR gate 49 outputs a signal, which indicates a logical OR between the signal RESET and the signal STOP, to the reset terminals R of the D flip-flops 42, 43. Moreover, the signal STOP is inputted to the set terminal S of the D flip-flop 44. The signal RESET is inputted to the reset terminal R of the D flip-flop 44.

When the signal RESET becomes at the high level, the output of the D flip-flop 41 is set to the high level, and the outputs of the D flip-flops 42, 43 and 44 are set to the low level. Thus, when the signal RESET becomes at the high level, the signal P1 is set to the high level, and the signals P2, P3 and P4 are set to the low level. When the signal STOP becomes at the high level, the outputs of the D flip-flops 41, 42 and 43 are set to the low level, and the output of the D flip-flop 44 is set to the high level. Hence, when the signal STOP is at the high level, the signals PI, P2 and P3 are set to the low level, and the signal P4 is set to the high level.

The frequency selector 6 has the configuration as mentioned above. The outputs of the D flip-flops 41, 42, 43 and 44 included in the frequency selector 6 are outputted to the outputting unit 7 as the signals P1, P2, P3 and P4, respectively.

The signals P1 to P4 are inputted to the outputting unit 7. Also, the clock signals CLK1, CLK2, CLK3 and CLK4 are further inputted to the outputting unit 7.

The outputting unit 7 outputs the clock signal CLK1 as the clock signal CIN when the signal P1 is at the high level. Similarly, the outputting unit 7, when the clock signals P2, P3 and P4 are at the high level, outputs the clock signals CLK2, CLK3 and CLK4 as the clock signal CIN, respectively.

Figure 9:
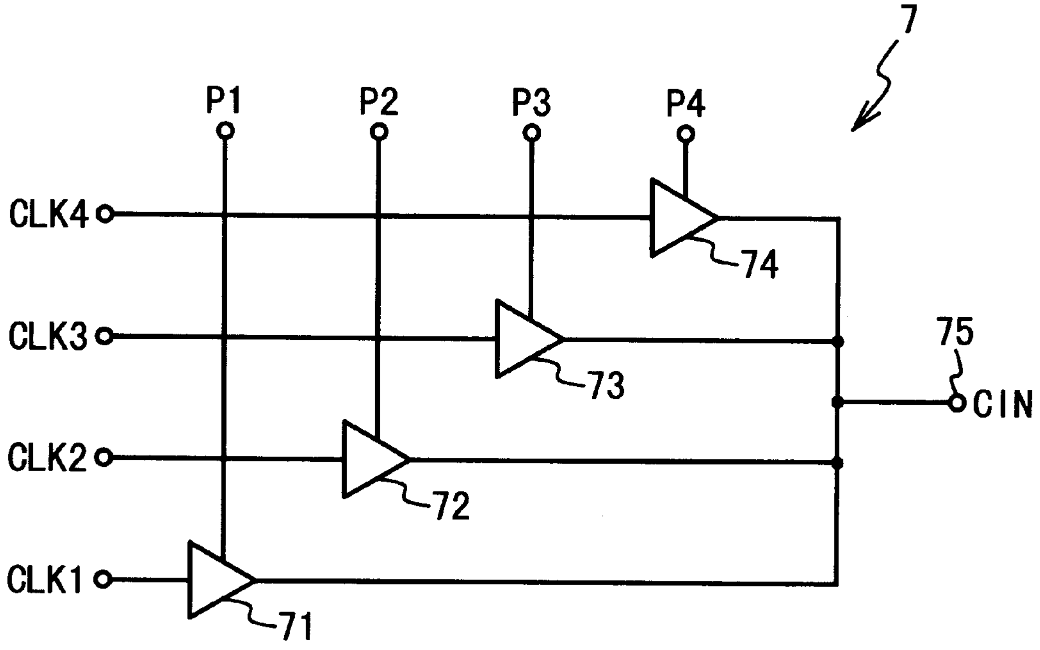
FIG. 9 shows a configuration of a outputting unit 7 included in the booster of the first embodiment.

FIG. 9 shows the circuit diagram of the outputting unit 7. The outputting unit 7 includes a clocked buffer 71. The signal P1 and the clock signal CLK1 are inputted to the clocked buffer 71. When the signal P1 is at the high level, the clocked buffer 71 outputs the clock signal CLK1. In the clocked buffer 71, when the signal P1 is at the low level, its output becomes in a state of the high level impedance.

Similarly, the clock signals CLK2, CLK3 and CLK4 are inputted to the clocked buffers 72, 73 and 74, respectively. The clocked buffers 72, 73 and 74 output the clock signals CLK2, CLK3 and CLK4, respectively, in accordance with the signals P2, P3 and P4.

The clocked buffers 71, 72, 73 and 74 are connected to a node 75. A voltage of the node 75 is outputted as a clock signal CIN. The clock signal CIN is outputted to the charge pumping circuit 1.

Here, the clock signal CLK1 implies a clock supplied from an outer portion of the booster 10. The clock signals CLK2, CLK3 and CLK4 are generated by the divider 8. The divider 8 divides the clock signal CLK1 to accordingly generate the clock signals CLK2, CLK3 and CLK4.

Figure 10:
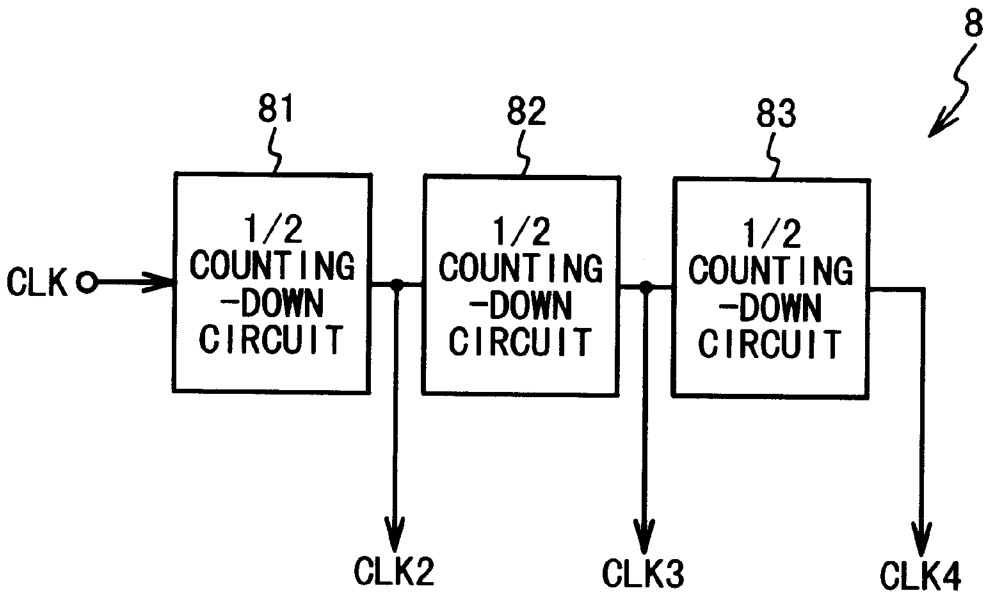
FIG. 10 shows a configuration of a divider 8 included in the booster of the first embodiment.
Figures 11A, 11B, 11C, 11D, 11E, 11F, 11G, 11H, 11I, 11J:
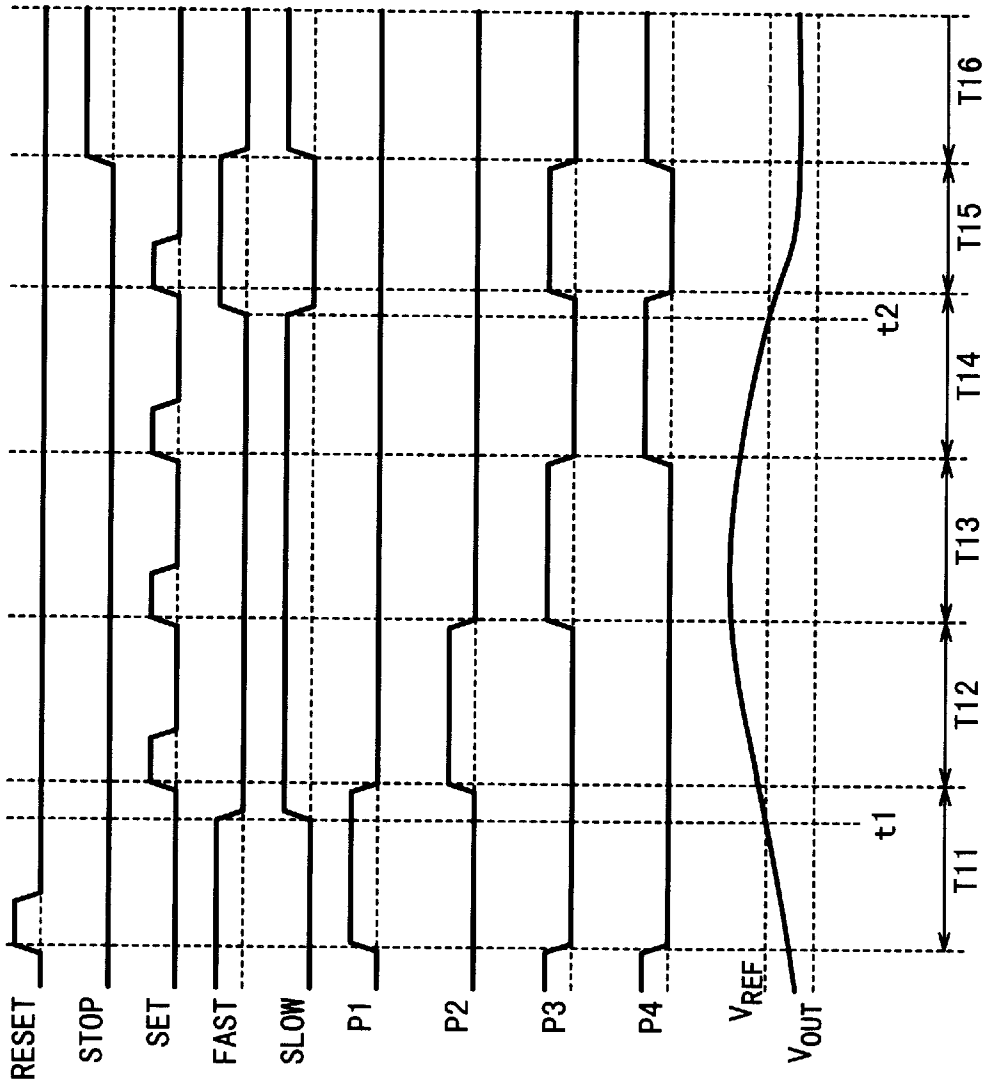
FIGS. 11A to 11J are timing charts of explaining an operation of the booster of the first embodiment in the present invention.

FIG. 10 shows the circuit configuration of the divider 8. The divider 8 includes a ½ divider 81. The clock signal CLK1 is inputted to the ½ divider 81. The ½ divider 81 halves a frequency of the CLK1 to then generate CLK2. The CLK2 is outputted to a ½ divider 82. A ½ divider 83 halves a frequency of the CLK2 to then generate CLK3. Similarly, a ½ divider 84 halves a frequency of the CLK3 to then generate a clock signal CLK4. The clock signals CLK1, CLK2, CLK3 and CLK4 are outputted to the outputting unit 7.

The operation of the booster of the first embodiment according to the present invention will be described below with reference to FIGS. 10A to 10I. The initial state of the booster 10 is assumed as follows. The signal RESET, the signal STOP and the signal SET are assumed to be at the low level. The signal FAST is assumed to be at the high level. The signal SLOW is assumed to be at the low level. That is, the voltage $V_{OUT}$ is assumed to be lower than the standard voltage $V_{REF}$. The signals P1, P2 and P4 are assumed to be at the low level. The signal P3 is assumed to be at the high level. That is, the clock signal CLK3 is assumed to be at the selected state.

At the beginning of a period T11, the signal RESET becomes at the high level. Then, the signal P1 is set to the high level, and the signals P2, P3 and P4 are set to the low level. The frequency selector 6 selects the clock signal CLK1. The charge pumping circuit 1 supplies charges at its maximum performance. The voltage $V_{OUT}$ is made higher. At a time t1 the voltage $V_{OUT}$ exceeds the standard voltage $V_{REF}$, the signal FAST is shifted to the low level, and the signal SLOW is shifted to the high level.

In succession, at the beginning of a period T12, a pulse having a predetermined pulse width is inputted as the signal SET. When the signal SET becomes at the high level, the signal FAST is at the low level, and the signal SLOW is at the high level. When the signal FAST and the signal SLOW are detected, the signal P1 is at the high level. The signal P1 is shifted from the high level to the low level, and the signal P2 is shifted from the low level to the high level. The signals P3, P4 are kept in their original states. The frequency selector 6 changes the clock signal selected as the clock signal CIN, from the clock signal CLK1 to the clock signal CLK2. As a result, a clock signal having a lower frequency is selected as the clock signal CIN.

In succession, at the beginning of a period T13, a pulse is inputted as the signal SET. When the signal SET becomes at the high level, the signal FAST is at the low level, and the signal SLOW is at the high level. The signal P2 is shifted from the high level to the low level, and the signal P3 is shifted from the low level to the high level. The clock signal CLK3 is selected as the clock signal CIN.

In succession, at the beginning of a period T14, a pulse is inputted as the signal SET. When the signal SET becomes at the high level, the signal FAST is at the low level, and the signal SLOW is at the high level. The signal P3 is shifted from the high level to the low level, and the signal P4 is shifted from the low level to the high level. The clock signal CLK4 is selected as the clock signal CIN.

During the period T14, the voltage $V_{OUT}$ continues to be dropped. At a time t2, the output voltage $V_{OUT}$ becomes lower than the standard voltage $V_{REF}$. At the time t2, the signal FAST is shifted to the high level, and the signal SLOW is shifted to the low level.

In succession, at the beginning of a period T15, a pulse is inputted as the signal SET. When the signal SET becomes at the high level, the signal FAST is at the high level, and the signal SLOW is at the low level. The signal P4 is shifted from the high level to the low level, and the signal P3 is shifted from the low level to the high level. The clock signal CLK3 is selected as the clock signal CIN. The frequency of the clock signal CIN becomes higher. The drop of the voltage $V_{OUT}$ is suppressed.

In succession, at the beginning of a period T16, the signal STOP becomes at the high level. The semiconductor integrated circuit including the booster of the first embodiment enters the standby mode. At this time, the signals P1, P2 and P3 become at the low level. The signal P4 becomes at the high level. The signal SLOW becomes at the high level, and the signal FAST becomes at the low level. The electric power consumed by the charge pumping circuit 1 is suppressed.

As mentioned above, the booster of the first embodiment, when the voltage $V_{OUT}$ is higher than the standard voltage $V_{REF}$, decreases the frequency of the clock signal CIN inputted to the charge pumping circuit 1. When the voltage $V_{OUT}$ is lower than the standard voltage $V_{REF}$, it increases the frequency of the clock signal CIN inputted to the charge pumping circuit 1.

The booster of the first embodiment can reduce the electric power consumption. This is because the booster of the first embodiment functions by using the clock signal having the frequency required to at least maintain the output voltage $V_{OUT}$ close to the standard voltage $V_{REF}$. Moreover, the output voltage $V_{OUT}$ is controlled to thereby make the output voltage $V_{OUT}$ stable.

The number of clock signals inputted to the outputting unit 7 is not limited to 4. The number of clock signals may be equal to or greater than 3. At this time, the configurations of the frequency selector 6 and the outputting unit 7 are changed in accordance with the number of clock signals.

Also, the frequencies of the clock signals CLK2 to CLKn are not limited to the above-mentioned frequencies. Also, the clock signals CLK2 to CLKn can be generated by the semiconductor circuit other than the divider 8, for example, another timer.

Figure 12:
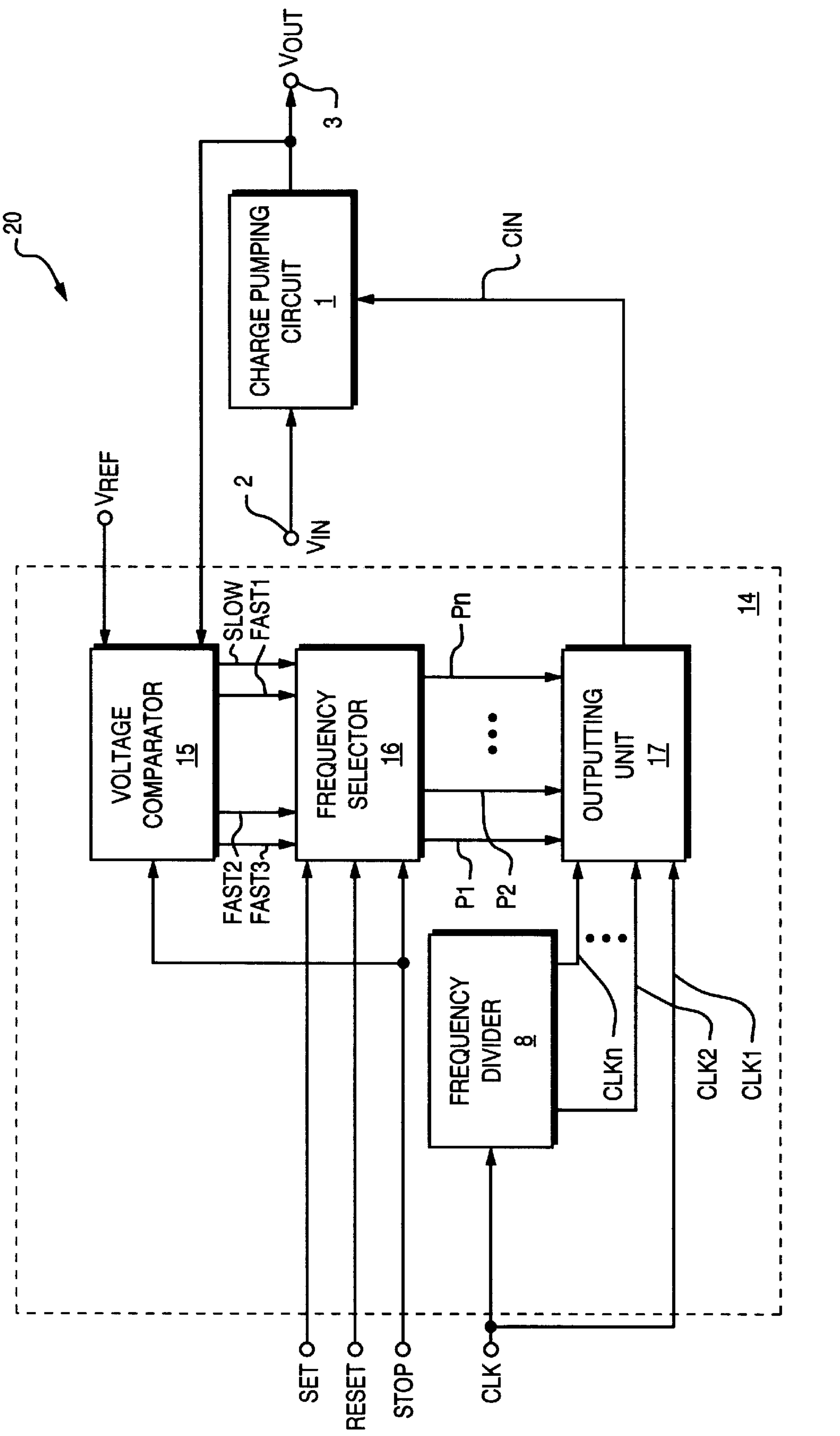
FIG. 12 shows a configuration of a booster of a second embodiment in the present invention.

A booster of a second embodiment in the present invention will be described below. FIG. 12 is a block diagram of the booster of the second embodiment. The booster of the second embodiment is provided with a charge pumping circuit 1 and a switching circuit 14.

The charge pumping circuit 1 uses a clock signal CIN, raises an input voltage $V_{IN}$, and generates an output voltage $V_{OUT}$. The charge pumping circuit 1 has the same configuration as that described in the first embodiment, and carries out the same operation.

The switching circuit 14 outputs one clock signal selected from among a plurality of clock signals CLK1 to CLKn (n is the natural number) as the clock signal CIN, similarly to the switching circuit 4 included in the booster of the first embodiment.

Also, when the signal RESET is at the high level and the signal STOP is at the high level, the switching circuit 14 carries out the operation similar to that of the switching circuit 4. The switching circuit 14, when the signal RESET is at the high level, outputs the clock signal CLK1 as the clock signal CIN. Here, the clock signal CLK1 is a clock signal having the highest frequency of the clock signals CLK1, CLK2 to CLKn.

The switching circuit 14, when the signal STOP is at the high level, outputs the clock signal CLKn as the clock signal CIN. Here, the clock signal CLKn is a signal having the lowest frequency of the clock signals CLK1 to CLKn.

However, the switching circuit 14 is different from the switching circuit 4 in the following points. The switching circuit 4 detects which of the output voltage $V_{OUT}$ and the standard voltage $V_{REF}$ is larger, and accordingly determines the clock signal CIN. On the other hand, the switching circuit 14 selects the clock signal CIN, in accordance with the difference between the output voltage $V_{OUT}$ and the standard voltage $V_{REF}$. That is, the switching circuit 14 selects the clock signal having the higher frequency, as the difference between the output voltage $V_{OUT}$ and the standard voltage $V_{REF}$ is larger. In order to carry out such operation, the switching circuit 14 has the configuration in which the voltage comparator 5 of the switching circuit 4 is replaced with a voltage comparator 15 and the frequency selector 6 is replaced with a frequency selector 16.

The configuration of the switching circuit 14 will be described below. Hereafter, a case is exemplified in which the number of clock signals selected by the switching circuit 14 is 4, namely, n=4.

The switching circuit 14 includes the voltage comparator 15. The voltage comparator 15 generates a second standard voltage $V_{REF2}$ and a third standard voltage $V_{REF3}$ from the standard voltage $V_{REF}$. The voltage comparator 15 compares the output voltage $V_{OUT}$ with each of the first, second and third standard voltages $V_{REF1}$, $V_{REF2}$, $V_{REF3}$. Here, the first standard voltage $V_{REF1}$ is the standard voltage $V_{REF}$. The voltage comparator 15 outputs the comparison result between the output voltage $V_{OUT}$ and each of the first, second and third standard voltages $V_{REF1}$, $V_{REF2}$, $V_{REF3}$ to the frequency selector 16 by using the signal FAST, a signal FAST2, a signal FAST3 and the signal SLOW.

Also, the voltage comparator 15 functions in accordance with the signal STOP. The voltage comparator 15 carries out the above-mentioned operation when the signal STOP is at the low level. When the signal STOP is at the high level, the voltage comparator 15 stops operating in order to reduce the electric power consumption. Also, when the signal STOP is at the high level, the voltage comparator 15 sets the signal FAST to the low level, and sets the signal SLOW to the high level. Its reason is as mentioned in the description of the first embodiment.

Figure 13:
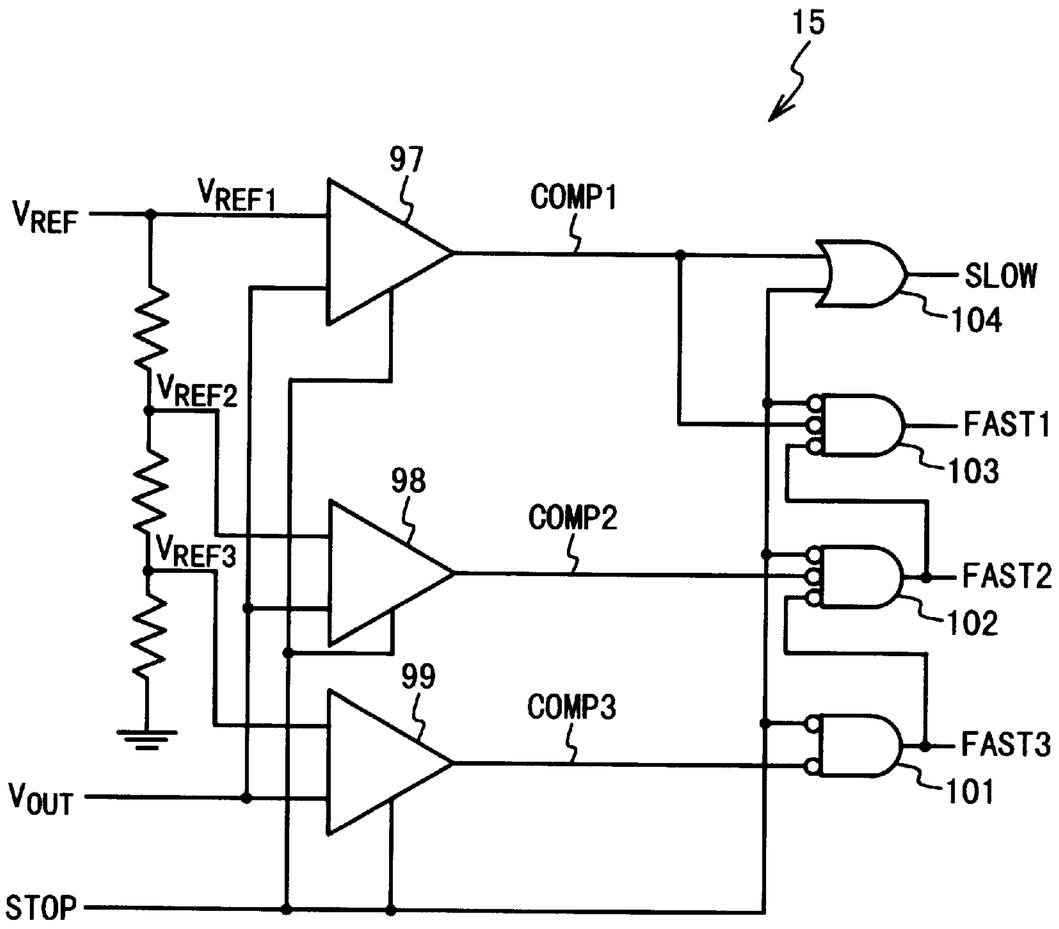
FIG. 13 shows a configuration of a voltage comparator 15 included in the booster of the second embodiment.

FIG. 13 is the circuit diagram of the voltage comparator 15. The standard voltage $V_{REF}$ is inputted to a node 91. One terminal of a resistor 92 is connected to the node 91. The other terminal of the resistor 92 is connected to a node 93. One terminal of a resistor 94 is connected to the node 93.

The other terminal of the resistor 94 is connected to a node 95. One terminal of a resistor 96 is connected to the node 95. The other terminal of the resistor 96 is grounded.

The standard voltage $V_{REF}$ is divided by the resistors 93, 94 and 96. The first standard voltage $V_{REF1}$ is a voltage of the node 91 and equal to the standard voltage $V_{REF}$. The second standard voltage $V_{REF2}$ is a voltage of the node 93. The second standard voltage $V_{REF2}$ is lower than the first standard voltage $V_{REF1}$. The third standard voltage $V_{REF3}$ is a voltage of the node 95. The third standard voltage $V_{REF3}$ is lower than the second standard voltage $V_{REF2}$.

The output voltage $V_{OUT}$ and the first standard voltage $V_{REF1}$ are inputted to a first comparator 97. The first comparator 97 compares the output voltage $V_{OUT}$ with the first standard voltage $V_{REF1}$. The first comparator 97, when the output voltage $V_{OUT}$ is higher than the first standard voltage $V_{REF1}$, sets a signal COMP1 to the high level. The first comparator 97, when the output voltage $V_{OUT}$ is lower than the first standard voltage $V_{REF1}$, sets the signal COMP1 to the low level.

A second comparator 98 compares the output voltage $V_{OUT}$ with the second standard voltage $V_{REF2}$. The second comparator 98, when the output voltage $V_{OUT}$ is higher than the second standard voltage $V_{REF2}$, sets a signal COMP2 to the high level. The first comparator 97, when the output voltage $V_{OUT}$ is lower than the second standard voltage $V_{REF2}$, sets the signal COMP2 to the low level.

A third comparator 99 compares the output voltage $V_{OUT}$ with the third standard voltage $V_{REF3}$. The third comparator 99, when the output voltage $V_{OUT}$ is higher than the third standard voltage $V_{REF3}$, sets a signal COMP3 to the high level. The third comparator 99, when the output voltage $V_{OUT}$ is lower than the third standard voltage $V_{REF3}$, sets the signal COMP3 to the low level.

An AND gate 101 carries out a logical AND between a negative logic of the signal COMP3 and a negative logic of the signal STOP, and outputs as the signal FAST3. An AND gate 102 carries out a logical AND between a negative logic of the signal FAST3 and a negative logic of the signal COMP2 and the negative logic of the signal STOP, and outputs as the signal FAST2. An AND gate 103 carries out a logical AND between a negative logic of the signal FAST2 and a negative logic of the signal COMP1 and the negative logic of the signal STOP, and outputs as the signal FAST1. An OR gate 104 carries out a logical OR between the signal COMP1 and the signal STOP, and outputs as the signal SLOW.

When the signal STOP is at the high level, the signal SLOW is set to the high level, and the signals FAST1, FAST2 and FAST3 are set to the low level. When the signal STOP is at the low level, the signal SLOW and the signals FAST1, FAST2 and FAST3 are determined in accordance with the voltage $V_{OUT}$, as follows.

When the output voltage $V_{OUT}$ is higher than the first standard voltage $V_{REF1}$, the signal SLOW is set to the high level, and the signals FAST1, FAST2 and FAST3 are set to the low level.

When the output voltage $V_{OUT}$ is higher than the second standard voltage $V_{REF2}$ and lower than the first standard voltage $V_{REF1}$, the signal FAST1 is set to the high level, and the signals FAST2, FAST3 and the signal SLOW are set to the low level.

When the output voltage $V_{OUT}$ is higher than the third standard voltage $V_{REF3}$ and lower than the second standard voltage $V_{REF2}$, the signal FAST2 is set to the high level, and the signals FAST1, FAST2 and the signal SLOW are set to the low level.

When the output voltage $V_{OUT}$ is lower than the third standard voltage $V_{REF3}$, the signal FAST3 is set to the high level, and the signals FAST1, FAST2 and the signal SLOW are set to the low level.

In this way, the signal SLOW and the signals FAST1, FAST2 and FAST3 are the signals indicative of the detection result of the voltage $V_{OUT}$. Also, the signal SLOW and the signals FAST1, FAST2 and FAST3 are the signals in which only one signal is at the high level.

The signal SLOW and the signals FAST1, FAST2 and FAST3 are outputted to the frequency selector 16.

The signal SET is inputted to the frequency selector 16. When the signal SET is at the high level, the frequency selector 16 detects the signal SLOW and the signals FAST1, FAST2 and FAST3. The frequency selector 16 determines that any one of the clock signals CLK1, CLK2, CLK3 and CLK4 is the clock signal CIN, in accordance with the detected result.

The clock signal CIN is determined as follows. The frequency selector 16 decreases the frequency of the clock signal CIN when the signal SLOW is at the high level. Also, the frequency selector 16 increases the frequency of the clock signal CIN when any one of the signals FAST1, FAST2 and FAST3 is at the high level. The degree of increasing the frequency of the clock signal CIN depends on which of the signals FAST1, FAST2 and FAST3 is at the high level.

The degree of increasing the frequency of the clock signal CIN is higher in order of the signals FAST3, FAST2 and FAST1. When the signal FAST3 is at the high level, the frequency of the clock signal CIN is increased the most quickly. When the signal FAST3 is at the high level, the output voltage $V_{OUT}$ is the lowest. That is, it is the farthest from the standard voltage $V_{REF}$. When the signal FAST3 is at the high level, it is necessary to increase the output voltage $V_{OUT}$ the most quickly.

The frequency selector 16 reports the determined result to the outputting unit 7 by using signals P1, P2, P3 and P4. Any one of the signals P1, P2, P3 and P4 is at the high level. When the signal P1 is at the high level, this implies that the clock signal CLK1 is selected. Similarly, when a signal Pi (i is a natural number between 1 and 4) is at the high level, this implies that a clock signal CLKi is selected.

The signal RESET and the signal STOP are further inputted to the frequency selector 16. The operation when the signal RESET is at the high level and the signal STOP is at the high level is similar to that of the frequency selector 6.

Figure 14:
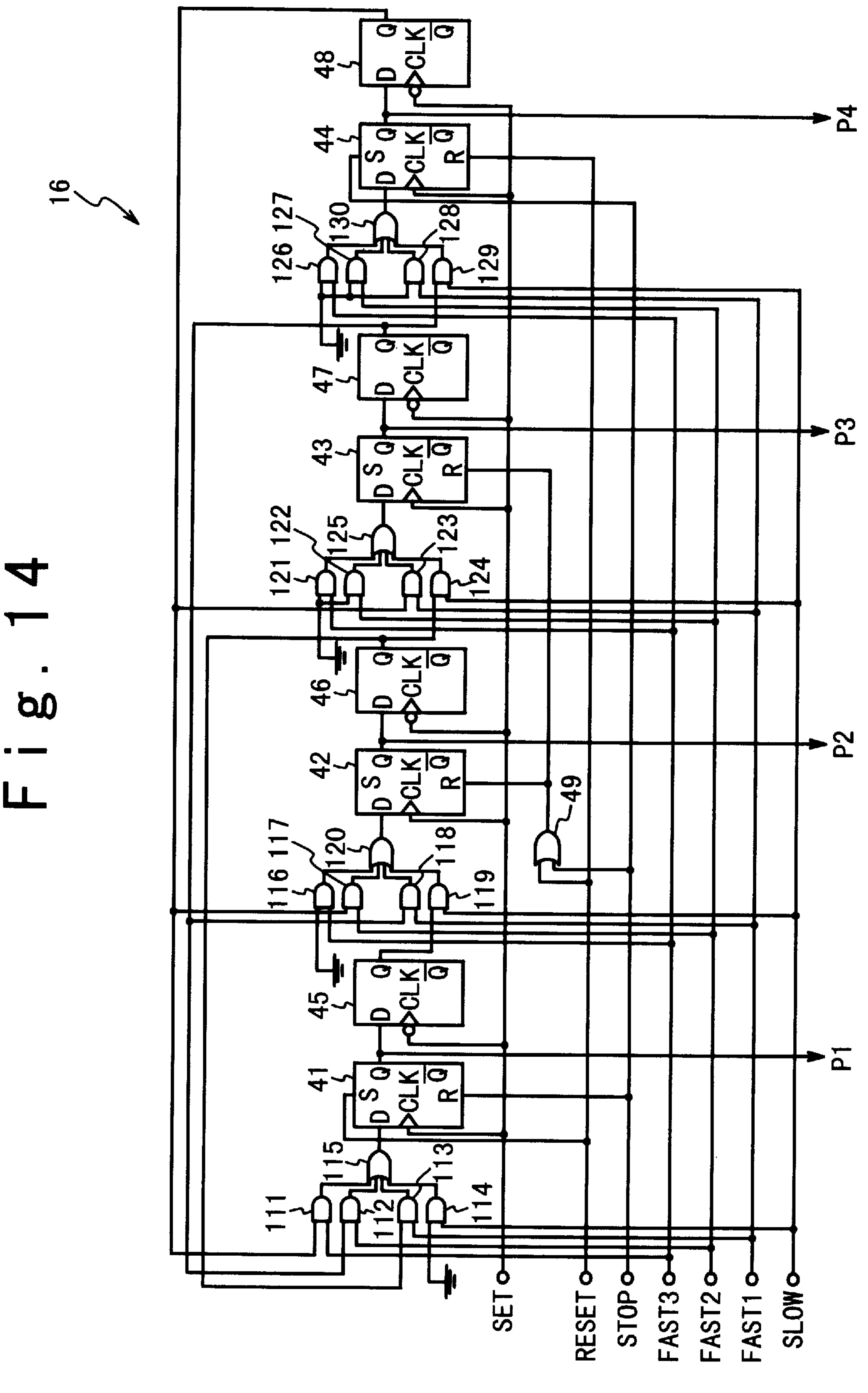
FIG. 14 shows a frequency selector 16 included in the booster of the second embodiment.
Figures 15A, 15B, 15C, 15D, 15E, 15F, 15G, 15H, 15I, 15J, 15K, 15L:
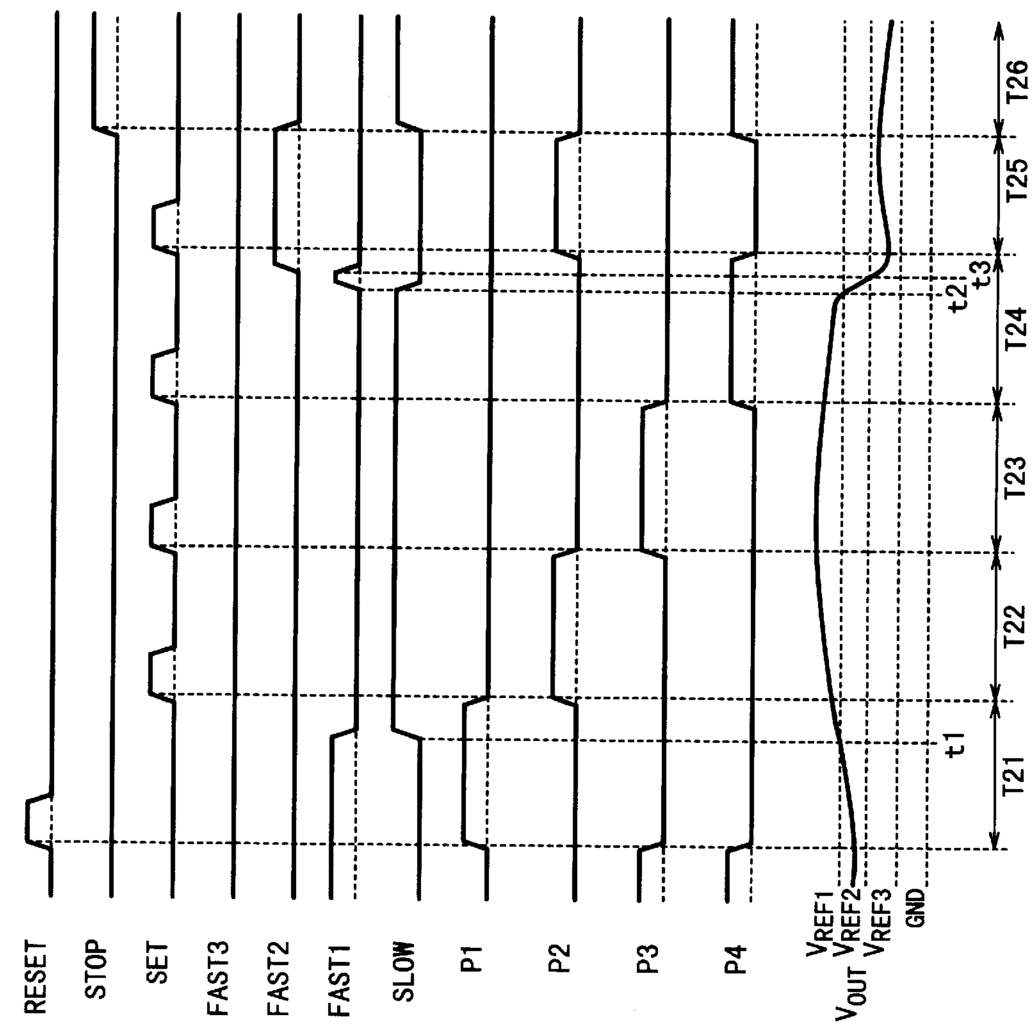
FIGS. 15A to 15L are timing charts of explaining an operation of the booster of the second embodiment in the present invention.

FIG. 14 shows the circuit diagram of the frequency selector 16. The frequency selector 16 has the circuit configuration substantially similar to that of the frequency selector 6. Respective outputs of the D flip-flops 41, 42, 43 and 44 are the signals P1, P2, P3 and P4.

However, the frequency selector 16 is different from the frequency selector 6 in the fact that the signals inputted to the data terminals D of the D flip-flops 41 to 44 are switched in accordance with the signal SLOW and the signals FAST1, FAST2 and FAST3.

The signals inputted to the data terminals D of the D flip-flops 41 to 44 are the signals outputted by the D flip-flops 45 to 48 or the ground potential. The data terminal D of any one of the D flip-flops 41 to 44 to which the signals outputted by the D flip-flops 45 to 48 are inputted is switched in accordance with the signal SLOW and the signals FAST1, FAST2 and FAST3. The switching operation is carried out by AND gates 111 to 114, 116 to 119, 121 to 124 and 126 to 129 and OR gates 115, 120, 125 and 130.

A circuit connected to the data terminal D of the D flip-flop 41 has the following configuration. The signal FAST3 is inputted to one input terminal of the AND gate 111, and an output terminal of the D flip-flop 48 is connected to the other input terminal. The signal FAST2 is inputted to one input terminal of the AND gate 112, and an output terminal of the D flip-flop 47 is connected to the other input terminal. The signal FAST1 is inputted to one input terminal of the AND gate 113, and an output terminal of the D flip-flop 46 is connected to the other input terminal. The signal SLOW is inputted to one input terminal of the AND gate 114, and the other input terminal is connected to the ground potential.

Output signals of the AND gates 111 to 114 are inputted to the OR gate 115. An output signal of the OR gate 115 is inputted to the data terminal D of the D flip-flop 41.

When the signal FAST3 is at the high level, the output terminal Q of the D flip-flop 48 is connected to the data terminal D of the D flip-flop 41. When the signal FAST2 is at the high level, the output terminal Q of the D flip-flop 47 is connected to the data terminal D of the D flip-flop 41. When the signal FAST1 is at the high level, the output terminal Q of the D flip-flop 46 is connected to the data terminal D of the D flip-flop 41. When the signal SLOW is at the high level, the ground potential is inputted to the data terminal D of the D flip-flop 41.

A circuit connected to the data terminal D of the D flip-flop 42 has the following configuration. The signal FAST3 is inputted to one input terminal of the AND gate 116, and the ground potential is inputted to the other input terminal. The signal FAST2 is inputted to one input terminal of the AND gate 117, and an output terminal of the D flip-flop 48 is connected to the other input terminal. The signal FAST1 is inputted to one input terminal of the AND gate 118, and an output terminal of the D flip-flop 47 is connected to the other input terminal. The signal SLOW is inputted to one input terminal of the AND gate 119, and the other input terminal is connected to the ground potential.

Output signals of the AND gates 116 to 119 are inputted to the OR gate 120. An output signal of the OR gate 120 is inputted to the data terminal D of the D flip-flop 42.

When the signal FAST3 is at the high level, the ground potential is inputted to the data terminal D of the D flip-flop 42. When the signal FAST2 is at the high level, the output terminal Q of the D flip-flop 48 is connected to the data terminal D of the D flip-flop 42. When the signal FAST1 is at the high level, the output terminal Q of the D flip-flop 47 is connected to the data terminal D of the D flip-flop 42. When the signal SLOW is at the high level, the output terminal Q of the D flip-flop 45 is connected to the data terminal D of the D flip-flop 42.

A circuit connected to the data terminal D of the D flip-flop 43 has the following configuration. The signal FAST3 is inputted to one input terminal of the AND gate 121, and the ground potential is inputted to the other input terminal. The signal FAST2 is inputted to one input terminal of the AND gate 122, and the ground potential is inputted to the other input terminal. The signal FAST1 is inputted to one input terminal of the AND gate 123, and an output terminal D of the D flip-flop 48 is connected to the other input terminal. The signal SLOW is inputted to one input terminal of the AND gate 124, and the other input terminal is connected to the output terminal Q of the D flip-flop 45.

Output signals of th e AND gates 121 to 124 are inputted to the OR gate 125. An output signal of the OR gate 125 is inputted to the data terminal D of the D flip-flop 43.

When the signals FAST3, FAST2 are at the high level, the ground potential is inputted to the data terminal D of the D flip-flop 43. When the signal FAST1 is at the high level, the output terminal Q of the D flip-flop 48 is connected to the data terminal D of the D flip-flop 43. When the signal SLOW is at the high level, the output terminal Q of the D flip-flop 46 is connected to the data terminal D of the D flip-flop 43.

A circuit connected to the data terminal D of the D flip-flop 44 has the following configuration. The signal FAST3 is inputted to one input terminal of the AND gate 126, and the ground potential is inputted to the other input terminal. The signal FAST2 is inputted to one input terminal of the AND gate 127, and the ground potential is inputted to the other input terminal. The signal FAST1 is inputted to one input terminal of the AND gate 128, and the ground potential is inputted to the other input terminal. The signal SLOW is inputted to one input terminal of the AND gate 129, and the output terminal of the D flip-flop 47 is connected to the other input terminal.

Output signals of the AND gates 126 to 129 are inputted to the OR gate 130. An output signal of the OR gate 130 is inputted to the data terminal D of the D flip-flop 44.

When the signals FAST3, FAST2 and FAST1 are at the high level, the ground potential is inputted to the data terminal D of the D flip-flop 44. When the signal SLOW is at the high level, the output terminal Q of the D flip-flop 47 is connected to the data terminal D of the D flip-flop 44.

Also, the D flip-flops 41 to 44 change the held data in accordance with the signal RESET and the signal STOP. In the frequency setting circuit 16, the wiring through which the signal RESET and the signal STOP are inputted to the reset terminals R and the set terminals S of the D flip-flops 41 to 44 has the configuration similar to that of the frequency setting circuit 6.

The frequency selector 16 has the above-mentioned configuration. The outputs of the D flip-flops 41, 42, 43 and 44 included in the frequency selector 16 are outputted to the outputting unit 7 as the signals P1, P2, P3 and P4, respectively.

The configuration of the outputting unit 7 is as described in the explanation of the booster in the first embodiment. Also, the configuration of the divider 8 is as described in the explanation of the booster in the first embodiment.

The operation of the booster of the second embodiment according to the present invention will be described below with reference to FIGS. 15A to 15I. An initial state of a booster 20 is assumed as follows. The signal RESET, the signal STOP and the signal SET are assumed to be at the low level. The output voltage $V_{OUT}$ is assumed as follows:

$V_{REF2}<V_{OUT}<V_{REF1}$

At this time, the signal FAST1 is at the high level. The signal SLOW and the signal FAST2, FAST3 are at the low level. The signals P1, P2 and P4 are assumed to be at the low level. The signal P3 is assumed to be at the high level. That is, it is assumed that the clock signal CLK3 is at the selected state.

At the beginning of a period T21, the signal RESET is at the high level. Then, the signal P1 is set to the high level, and the signals P2, P3 and P4 are set to the low level. The frequency selector 16 selects the clock signal CLK1. The charge pumping circuit 1 supplies charges at its maximum performance. The voltage $V_{OUT}$ is made higher. At a time t1 when the voltage $V_{OUT}$ exceeds the first standard voltage $V_{REF1}$, the signal FAST1 is shifted to the low level, and the signal SLOW is shifted to the high level.

In succession, at the beginning of a period T22, a pulse having a predetermined pulse width is inputted as the signal SET. When the signal SET becomes at the high level, the signals FAST1, FAST2 and FAST3 are at the low level, and the signal SLOW is at the high level.

When the signal FAST1 and the signal SLOW are detected, the signal P1 is at the high level. The signal P1 is shifted from the high level to the low level, and the signal P2 is shifted from the low level to the high level. The signals P3, P4 are kept in their original states. The frequency selector 16 changes the clock signal selected as the clock signal CIN, from the clock signal CLK1 to the clock signal CLK2. As a result, a clock signal having a lower frequency is selected as the clock signal CIN.

In succession, at the beginning of a period T23, a pulse is inputted as the signal SET. When the signal SET becomes at the high level, the signals FAST1, FAST2 and FAST3 are at the low level, and the signal SLOW is at the high level. The signal P2 is shifted from the high level to the low level, and the signal P3 is shifted from the low level to the high level. The clock signal CLK3 is selected as the clock signal CIN.

In succession, at the beginning of a period T24, a pulse is inputted as the signal SET. When the signal SET becomes at the high level, the signals FAST1, FAST2 and FAST3 are at the low level, and the signal SLOW is at the high level. The signal P3 is shifted from the high level to the low level, and the signal P4 is shifted from the low level to the high level. The clock signal CLK4 is selected as the clock signal CIN.

During the period T24, the voltage $V_{OUT}$ continues to be dropped. Let us suppose that the electric power consumption of the circuit connected to the output terminal 3 is sharply increased during the period T24. The voltage $V_{OUT}$ is sharply dropped. At a time t2, the output voltage $V_{OUT}$ becomes lower than the first standard voltage $V_{REF1}$. At the time t2, the signal FAST1 is shifted to the high level, and the signal SLOW is shifted to the low level. Moreover, at a time t3, the output voltage $V_{OUT}$ becomes lower than the second standard voltage $V_{REF2}$. The signal FAST1 is shifted to the low level, and the signal FAST2 is shifted to the high level.

In succession, at the beginning of a period T25, a pulse is inputted as the signal SET. When the signal SET becomes at the high level, the signal FAST2 is at the high level, and the signals FAST1, FAST3 and the signal SLOW are at the low level. The signal P4 is shifted from the high level to the low level, and the signal P2 is shifted from the low level to the high level. The clock signal CLK2 is selected as the clock signal CIN. The switching circuit 14 sharply increases the frequency of the clock signal CIN, since it detects the sharp drop of the output voltage $V_{OUT}$.

In succession, at the beginning of a period T26, the signal STOP is at the high level. The semiconductor integrated circuit including the booster of the second embodiment enters the standby mode. At this time, the signals P1, P2 and P3 are at the low level. The signal P4 is at the high level. The signal SLOW is at the high level, and the signals FAST1, FAST2 and FAST3 are at the low level. The electric power consumed by the charge pumping circuit 1 is suppressed.

As mentioned above, the booster of the second embodiment, when the voltage $V_{OUT}$ is higher than the standard voltage $V_{REF}$, decreases the frequency of the clock signal CIN inputted to the charge pumping circuit 1. When the output voltage $V_{OUT}$ is lower than the standard voltage $V_{REF}$, the booster 10 determines the frequency of the clock signal CIN in accordance with the degree of the drop of the output voltage $V_{OUT}$. When the output voltage $V_{OUT}$ has been largely dropped, the booster uses the clock signal having the higher frequency, as the clock signal CIN. When the degree of the drop of the output voltage $V_{OUT}$ is small, the booster 10 uses as the clock signal CIN the clock signal having the frequency lower than that of the case that the output voltage $V_{OUT}$ is largely dropped.

The booster of the second embodiment can reduce the electric power consumption, similarly to the booster of the first embodiment. This is because the booster of the second embodiment carries out the boosting operation by using the clock signal having the frequency required to at least maintain the output voltage $V_{OUT}$ close to the standard voltage $V_{REF}$. Moreover, the output voltage $V_{OUT}$ is controlled to thereby make the output voltage $V_{OUT}$ stable. At this time, the frequency of the clock signal to be used for the boosting operation is determined in accordance with the degree of the drop of the output voltage $V_{OUT}$. Thus, the booster of the second embodiment can quickly recover the output voltage $V_{OUT}$ to the standard voltage $V_{REF}$, even when the output voltage $V_{OUT}$ is sharply varied.

The first effect of the present invention lies in the reduction of the electric power consumed by the booster. This is because the booster according to the present invention carries out the boosting operation by using the clock signal having the frequency required to at least maintain the output voltage $V_{OUT}$ close to the standard voltage $V_{REF}$.

The second effect of the present invention lies in the stability of the output voltage of the booster. In the booster of the present invention, the switching circuit for outputting the clock signal to the charge pumping circuit monitors the output voltage $V_{OUT}$. Then, it adjusts the frequency of the clock signal used for the boosting operation, in accordance with the output voltage $V_{OUT}$.

The third effect of the present invention lies in the fact that the booster of the present invention can quickly recover the output voltage $V_{OUT}$ to the standard voltage $V_{REF}$, even when the output voltage $V_{OUT}$ is sharply varied. This is because the booster of the present invention determines the frequency of the clock signal used for the boosting operation, in accordance with the degree of the drop of the output voltage $V_{OUT}$.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A booster comprising:

a switching circuit outputting a clock signal; and a charge pumping circuit boosting an input voltage to generate an output voltage in response to said clock signal, wherein said switching circuit selects one from among a plurality of frequencies as a frequency of said clock signal in response to said output voltage and at least two reference voltages.

2. A booster according to claim 1, wherein said frequency of said clock signal is set to the highest one of said plurality of frequencies when an integrated circuit including said booster is reset.

3. A booster according to claim 1, wherein said frequency of said clock signal is set to the highest one of said plurality of frequencies when a power supply of an integrated circuit including said booster is turned on.

4. A booster according to claim 1, wherein said frequency of said clock signal is set to the lowest one of said plurality of frequencies when an integrated circuit including said booster is in a standby mode.

5. A booster according to claim 1, wherein said frequency of said clock signal is selected in response to a difference between said output voltage and at least one of said reference voltages.

6. A booster according to claim 5, wherein said frequency of said clock signal selected has a relatively high frequency when said output voltage is lower than a reference voltage.

7. A booster according to claim 1, wherein said switching circuit includes:

a voltage comparator which compares said output voltage with at least one of said reference voltages and generates a first signal indicating whether said output voltage is higher than at least one of said reference voltages;

a frequency selector which selects one of said plurality of frequencies in response to said first signal and generates a second signal indicating which of said plurality of frequencies is selected; and an outputting unit outputting said clock signal having said one of said plurality of frequencies in response to said second signal.

8. A booster according to claim 7, wherein said frequency of said clock signal is set to the highest one of said plurality of frequencies when an integrated circuit including said booster is reset.

9. A booster according to claim 7, wherein said frequency of said clock signal is set to the highest one of said plurality of frequencies when a power supply of an integrated circuit including said booster is turned on.

10. A booster according to claim 7, wherein said frequency of said clock signal is set to the lowest one of said plurality of frequencies when an integrated circuit including said booster is in a standby mode.

11. A method of operating a booster with a charge pumping circuit comprising:

selecting one from among a plurality of frequencies as a frequency of a clock signal;

generating said clock signal having said frequency; and boosting an input voltage to generate an output voltage in response to said clock signal, wherein said selecting is performed in response to said output voltage and at least two reference voltages.

12. A method according to claim 11, wherein said selecting includes selecting the highest one of said plurality of frequencies as said frequency of said clock signal when an integrated circuit including said booster is reset.

13. A method according to claim 11, wherein said selecting includes selecting the highest one of said plurality of frequencies as said frequency of said clock signal when a power supply of an integrated circuit including said booster is turned on.

14. A method according to claim 11, wherein said selecting includes selecting lowest one of said plurality of frequencies as said frequency of said clock signal when an integrated circuit including said booster is in a standby mode.

15. A method according to claim 11, wherein said selecting is performed in response to a difference between said output voltage and at least one of said reference voltages.

16. A method according to claim 15, wherein said frequency of said clock signal is increased when said output voltage is decreased.

17. The booster of claim 1, wherein said plurality of frequencies includes a first clock signal and the booster further includes:

a divider used to generate each of the remaining plurality of frequencies by dividing the first clock signal.

18. The booster of claim 17, wherein said divider further includes a half divider.

19. The booster of claim 1, wherein said at least two reference voltages include a first reference voltage Vref1 and a second reference voltage Vref2, and said output voltage and said first and second reference voltages have the relationship of Vref2<output voltage<Vref1.

20. The method of claim 11, wherein said plurality of frequencies includes a first clock signal and the method further includes:

dividing the first clock signal to generate each of the remaining plurality of frequencies.

21. The method of claim 20, wherein said at least two reference voltages include a first reference voltage Vref1 and a second reference voltage Vref2, and said output voltage and said first and second reference voltages have the relationship of Vref2<output voltage<Vref1.

* * * * *